United States Patent
Ford

(10) Patent No.: US 12,346,444 B2
(45) Date of Patent: *Jul. 1, 2025

(54) METHODS AND APPARATUS FOR INTERFERING WITH MALWARE USING DISPLACED DISPLAY ELEMENTS

(71) Applicant: SunStone Information Defense, Inc., Jamestown, OH (US)

(72) Inventor: David K. Ford, Jamestown, OH (US)

(73) Assignee: SunStone Information Defense, Inc., Jamestown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,174

(22) Filed: Dec. 21, 2023

(65) Prior Publication Data

US 2024/0134981 A1    Apr. 25, 2024

Related U.S. Application Data

(63) Continuation of application No. 16/963,226, filed as application No. PCT/US2019/014495 on Jan. 22, 2019, now Pat. No. 11,853,423.

(60) Provisional application No. 62/619,690, filed on Jan. 19, 2018.

(51) Int. Cl.
    *G06F 21/56*    (2013.01)
    *G06F 9/451*    (2018.01)

(52) U.S. Cl.
    CPC ............ *G06F 21/566* (2013.01); *G06F 9/451* (2018.02); *G06F 2221/033* (2013.01)

(58) Field of Classification Search
    CPC ...... G06F 21/83; G06F 21/568; G06F 21/566; G06F 9/451; G06F 2221/033; H04L 67/02
    USPC .......................................................... 726/23
    See application file for complete search history.

(56) References Cited

U.S. PATENT DOCUMENTS

| | | | | |
|---|---|---|---|---|
| 8,907,946 | B2* | 12/2014 | Bocq | G06F 3/04847 709/227 |
| 8,954,538 | B2* | 2/2015 | Erickson | H04N 21/4782 709/219 |
| 9,189,124 | B2* | 11/2015 | Pahlavan | G06F 3/0481 |
| 9,389,706 | B2 | 7/2016 | Glazer et al. | |
| 9,531,701 | B2 | 12/2016 | Turgeman | |
| 9,747,436 | B2 | 8/2017 | Turgeman | |

(Continued)

OTHER PUBLICATIONS

Search Report and Written Opinion dated Apr. 10, 2019 issued on International Patent Appl. No. PCT/US2019/014495 Filed: Jan. 22, 2019.

*Primary Examiner* — Amare F Tabor
(74) *Attorney, Agent, or Firm* — K&L Gates LLP

(57) ABSTRACT

Methods and apparatus for interfering with malware using displaced display elements are disclosed. In an example, a processor is configured to change a location of a displayed pointer by a first offset vector from a hidden true pointer. The processor is also configured to change a location of at least one application display element, such as a website "Submit" button, by a second offset vector from a hidden true application element. The first offset vector may have a similar magnitude as the second offset vector but an opposite direction Changing a location of a pointer and the application element by the offsets enables a user to interact with the application normally. However, the offsets prevent malware or a malicious application from interacting with the application.

20 Claims, 19 Drawing Sheets

(56) References Cited

U.S. PATENT DOCUMENTS

| | | | |
|---|---|---|---|
| 9,753,791 B2* | 9/2017 | Ghanakota | G06F 11/36 |
| 9,772,742 B2* | 9/2017 | Guest | H04L 41/22 |
| 9,832,237 B2* | 11/2017 | Lock | H04L 65/403 |
| 10,073,586 B2 | 9/2018 | Huang | |
| 10,275,112 B2 | 4/2019 | Nagao | |
| 2004/0109011 A1* | 6/2004 | Peterson, Jr. | G06F 16/9577 |
| | | | 707/E17.121 |
| 2007/0126749 A1 | 6/2007 | Tzruya et al. | |
| 2009/0113425 A1 | 4/2009 | Ports et al. | |
| 2009/0138810 A1 | 5/2009 | Howard et al. | |
| 2010/0149217 A1 | 6/2010 | Mielke | |
| 2012/0079390 A1 | 3/2012 | Ballagh et al. | |
| 2013/0300740 A1 | 11/2013 | Snyder et al. | |
| 2014/0063073 A1 | 3/2014 | Lee et al. | |
| 2014/0173504 A1 | 6/2014 | Gup et al. | |
| 2014/0267030 A1 | 9/2014 | Wu | |
| 2015/0120801 A1* | 4/2015 | McClain | G06F 9/546 |
| | | | 709/201 |
| 2017/0322637 A1 | 11/2017 | Cheng | |
| 2018/0234479 A1* | 8/2018 | Lilienthal | H04L 67/025 |

* cited by examiner

METHODS AND APPARATUS FOR INTERFERING WITH MALWARE USING DISPLACED DISPLAY ELEMENTS

PRIORITY CLAIM

This application is a continuation of U.S. patent application Ser. No. 16/963,226, now U.S. Pat. No. 11,853,423, filed on Jul. 18, 2020, which is a national phase entry of PCT Application No. PCT/US2019/014495, filed on Jan. 22, 2019, which claims priority to and the benefit of U.S. Provisional Patent Applications No. 62/619,690, filed on Jan. 19, 2018, the entirety of which is are incorporated herein by reference.

BACKGROUND

A pointer is one of the most ubiquitous aspects of computing. It is displayed as a graphic that changes locations within a display area based on inputs received from a mouse or similar input pointing device. Pointer properties, such as appearance and movement characteristics, are defined within a pointer file or specified in application code. The pointer properties are used by an operating system or application of a computer to display/move a pointer on a screen or within a display area. The pointer file also defines a "hot spot", which includes an active pixel or a group of pixels within a pixel area for the pointer graphic. Selection of a pointer causes a location or coordinates of the hot spot to be returned as the selected location on a screen.

FIG. 1A shows a diagram of a pointer data file 102a, which includes hot spot 104. The data file 102a includes a pixel area of 32×64 pixels. However, the viewable portion of the pointer itself may only comprise a portion of the pixel data, while the other portions are made transparent or hidden from view. The hot spot 104 is by default, typically defined to be the (0, 0) coordinate of the image. An operating system of a computer receives movement information from an input device and changes a position of the image file accordingly to reflect the user's movement.

At the time of a click event, the operating system of the computer identifies a location (e.g., screen or window coordinates) of the hot spot within the display area. The operating system then transmits the coordinates to an application that corresponds to the click event. The application executes program code based on a function defined at the coordinates of the click event.

Unbeknownst to many people, pointers can be manipulated remotely or locally by malware or malicious applications. Oftentimes, malware or malicious applications attempt to access secure webpages or data repositories by injecting pointer movement commends (e.g., commands designed to appear to originate from a pointing device) in connection with keyboard commands to an operating system of a computer or application on a server. In other words, the malware or malicious applications provide commands as though a user was entering commands through a trusted or validated computer as a way to access secure information. The malware or malicious application may be present on a user's computer or be located on a network and configured to intercept network traffic.

SUMMARY

The present disclosure provides a new and innovative system, method, and apparatus for detecting or interfering with malware using displaced display elements. The example method, apparatus, and system are configured to create an offset between displayed elements and hidden or invisible elements. The offset is not noticeable to a user and is configured to not change how a user views or interacts with a webpage or an application when using a pointing device. In addition, the offset between the displayed and hidden elements is undetectable by malware or malicious application. The offset is created to interfere with malware or a malicious application attempting to access and provide pointing inputs or selections in relation to the elements.

The elements subject to an offset include webpage or application elements, such as windows, buttons, scroll bars, text input fields, text, hyperlinks, images, etc. The elements also include input device elements, such as a pointer or cursor. The example system, method, and apparatus are configured to generate an offset between webpage or application elements and input device elements.

Generally, malware or a malicious application is configured to determine a position of a pointer or other input device based on information from the operating system of a computer. In addition, the malware or a malicious application is configured to determine locations of displayed page elements from website code or application code. Offsets created by the example system, method, and apparatus between an input device element and webpage/application elements prevent malware or a malicious application from being able to properly align, for example, a pointer with a webpage/application element. As a result, the applied offsets prevent the malware or malicious application from manipulating inputs for navigating or making submissions on a webpage or application.

In some embodiments, a security element may be included within the webpage or application code at a designated location related to the offset elements. The security element may be unintentionally selected by malware or a malicious application unaware of the offset. Selection of the security element may cause an alarm or alert to be transmitted to a user of the computer and/or an operator of the webpage or application. The alarm or alert may be indicative of the presence of the malware or malicious application. If a certain threshold of alerts and/or alarms are detected (e.g., 1, 2, 5, 10, etc.), the website or application provider may disable the computer's access to the webpage or application.

As described in more detail below, the offset may be consistent within a display area or application window. In some embodiments, the offset may vary as a function of pointer location and/or time to further prevent detection by malware or a malicious application. Offset variance based on location may be configured based on an equation, horizontal/vertical displacement, and/or randomization.

In a non-limiting example, a processor executing machine-readable instructions is configured to receive application code for displaying an application within an application viewer. The application code may include an element for display at a first element location, where the element is associated with a function that is executed after a pointer selection at the first element location. The example processor is also configured to determine a first offset vector for the element and a second offset vector for a pointer, the second offset vector having a same magnitude but an opposite direction of the first offset vector. The example processor is further configured to at least one of i) change a location of a pointer within a pixel area of a pointer file from a first pointer location to a second pointer location that is the second offset vector away from the first pointer location while leaving coordinates of a pointer hot spot unchanged, or ii) hide the pointer from view by modifying the pointer file and create a pointer image configured to track movement of the pointer that is the second offset vector away from the first pointer location. The example processor may also be configured to cause the changed application code to be displayed within the application viewer with the element located at the first element location and the function located at the second element location and cause the pointer or the pointer image to be displayed based on at least one of the changed pointer file or the pointer image. The example processor may receive coordinates associated with a pointer selection at the pointer hot spot and responsive to determining that the received coordinates correspond to the second element location, transmit an indication of the pointer selection being valid.

In another embodiment, a security server apparatus comprises an interface configured to receive application code for displaying an application within an application viewer of a client device. The application code includes an element for display at a first element location, the element associated with a function that is executed after a pointer selection at the first element location. The interface may also receive from the client device, coordinates associated with a pointer selection at a pointer hot spot within the application viewer. The security server apparatus also comprises a processor communicatively coupled to the interface and configured to determine a first offset vector for the element and a second offset vector for a pointer located at the use device. The second offset vector may have a same magnitude but an opposite direction of the first offset vector. The processor is also configured to change the application code such that the function is executed after a pointer selection at a second location that is the first offset vector away from the first element location and change a location of a pointer within a pixel area of a pointer file from a first pointer location to a second pointer location that is the second offset vector away from the first pointer location while leaving coordinates of a pointer hot spot unchanged. The example processor is further configured to determine that the received coordinates correspond to the second element location. The processor may operate in connection with the interface to transmit the changed application code to the client device for displayed within the application viewer with the element located at the first element location and the function located at the second element location and transmit the change to the pointer file to the client device to cause the pointer to be displayed based on changed pointer file. Moreover, the processor may operate in connection with the interface to responsive to determining that the received coordinates correspond to the second element location, generate an indication of the pointer selection being valid.

In yet another embodiment, a method for detecting malware includes setting a style for an operating system pointer to be invisible within a browser window generated in a display of a computing system, setting a style for a screen widget to be invisible, and positioning the invisible screen widget a first offset vector away from an original screen location of the screen widget. The method also includes generating a tailored pointer displaced by a second offset vector from the operating system pointer, where the first and second offset vectors are equal in magnitude and opposite in direction. The method further includes generating an image of the screen widget at the original screen location of the screen widget, receiving pointer click coordinates, and determining whether the pointer click coordinates correspond to the invisible screen location. The method may also include labelling the pointer click coordinates as valid in response to the pointer click coordinates corresponding to the invisible screen location and labelling the pointer click coordinates as potential malware in response to the pointer click coordinates not corresponding to the invisible screen location.

In a further embodiment, a method for detecting malware includes setting soft presentation, response, and interaction properties of an operating system pointer, and setting soft presentation, response, and interaction properties of a tailored pointer. The method also includes identifying page elements to display on a page, setting soft presentation, response, and interaction properties of the page elements, and displaying the page elements and the tailored pointer. The method further includes receiving pointer click coordinates, determining whether the pointer click coordinates corresponds to a valid user or malware, and labelling the pointer click coordinates as valid in response to the pointer click coordinates corresponding to a valid user. The method may also include labelling the pointer click coordinates as potential malware in response to the pointer click coordinates not corresponding to a valid user.

Additional features and advantages of the disclosed system, method, and apparatus are described in, and will be apparent from, the following Detailed Description and the Figures.

BRIEF DESCRIPTION OF THE FIGURES

The accompanying drawings, which are incorporated in and constitute a part of this specification, show certain aspects of the subject matter disclosed herein and, together with the description, help explain some of the principles associated with the disclosed implementations.

Like reference symbols in the various drawings indicate like elements.

DETAILED DESCRIPTION

Figure 1:
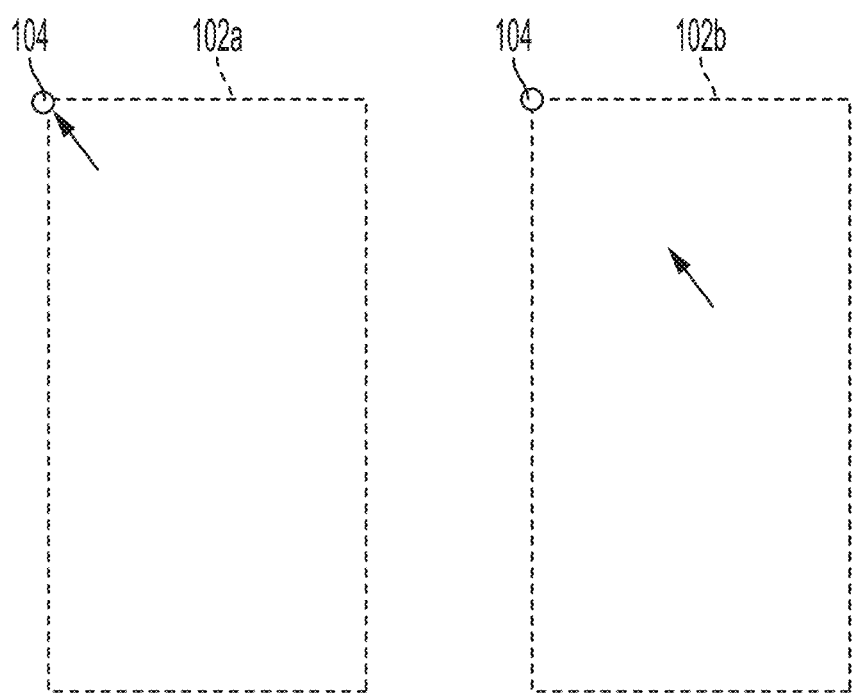
FIG. 1A illustrates an example of a pointer within a pixel image file representative of a type of image file painted by an operating system onto a monitor of a client device at a typical periodic update time (e.g. 60 Hz.).
FIG. 1B illustrates a data file tailored by an application window (e.g. browser), in which an arrow icon and an operating system ("OS") hot spot are not collocated, according to an example embodiment of the present disclosure.

The present disclosure relates in general to a method, apparatus, and system for generating a graphical pointer, mouse cursor, image, or the like (generally, "pointer" or other graphical input element) in a browser window or application viewer of a graphical user interface of a computer (e.g., a client device), in a location that differs from a default location of a pointer generated by the computer's OS, both of which have movements controlled by a user controlled input device such as a mouse, a trackball, slider or the like. Hereinafter, the moved or displaced pointer is called a "tailored pointer".

Reference is made throughout to the term "pointer". A pointer is specified by a pointer file (or application code) that defines how a symbol or a graphic image is to be displayed within a pixel area on a computer screen to mirror or echo movements of a pointing device. A pointer file or application code includes properties that specify appearance information, such as shape, color, size, shadow, etc. A pointer file or application code also includes properties that specify movement information, such as responsiveness, lag, inversion, etc. A pointer file or application code may further define a pixel location or set of pixels that comprise a hot spot.

Reference is also made throughout to a pointer selection and pointer position. As disclosed herein, a pointer selection corresponds to an activation of an actuator of a pointing input device, such as a left or right-click of a mouse. A pointer selection corresponds to a hot spot location on a screen or within an application viewer. A pointer position corresponds to a location of a pointer on a screen or within an application viewer. A position of a displayed pointer may not necessarily be the same location as a hot spot if an offset is created between the displayed pointer and the hot spot.

Reference is further made throughout to the term "mouse". A mouse includes a pointing input device that enables a user to specify a location of a pointer on a screen. The mouse may include a hardware device such as a touchpad, trackball, stylus pen, etc. The mouse may also include a touchscreen that enables a user to change a position of a pointer to enter mouse-like selections. The mouse may further include a virtual mouse that may include software that emulates mouse movement. For example, the virtual mouse may include virtual track ball that is displayed within a touchscreen of a client device. The virtual track ball enables a user to move a pointer, including a stylized pointer within an application viewer by selecting different locations or sliding their finger along the track ball. While the user's finger is located at the track ball, the hot spot for pointer selection corresponds to the pointer location or a location that is an offset from the pointer.

The example method, apparatus, and system are configured to generate a tailored pointer in connection with an offset between one or more application elements such as windows, buttons, scroll bars, text input fields, text, hyperlinks, images, etc. The application elements are configured to provide an application or webpage function that causes an application to perform one or more methods or a server hosting the application to perform one or more methods. The function may be defined to be located at coordinates of the application element such that a pointer selection of the element causes the function to be invoked. The application elements may include, for example, a "submit button" or an "ok button", which when pressed by a user using a pointer device, causes information entered into an application (or otherwise related to the application) to be transmitted or processed. The application elements may also include hyperlinks or images, which when selected by a user using a pointer device, cause the application or a server to navigate to a different location or provide content associated with the hyperlink.

The offset generated by the example method, apparatus, and system may comprise a vector that is between a viewable version of the element and a hidden version of the element, where the hidden version is configured with the related function. The viewable version may comprise a graphical element without an underlying function or a security function that provides an indication of malware when selected. In some examples, the method, apparatus, and system may forgo creating a hidden version of the element and instead change a page location for the function such that it no longer coincides with a location of the displayed element. As used herein, disclosure regarding the creation of a hidden element includes omitting creating an element and instead only moving a location of a selectable function.

The example method, apparatus, and system are also configured to create an offset between a graphical representation of a pointing input device, such as a pointer. The offset may be a vector that is between a hot spot of a pointer and a display of the pointer. The example method, apparatus, and system may be configured to modify or change a pointer file such that the pointer is displayed at the offset rather than being collocated with the hot spot. The offset for the application elements may be configured such that it is equal in magnitude and opposite in direction from the pointer offset. In some instances, pixel dimensions of the pixel file may be changed to increase the pixel area to permit greater degrees of offset. The relationship between the offset of the application elements and the pointer enables the pointer to be used by a legitimate user as though the offsets were not in place while at the same time interfering with malware's use of the pointer.

In some instances, the method, apparatus, and system may modify the pointer file to hide or make transparent a display of an OS pointer. The method, apparatus, and system may then create or modify a second pointer file (or a pointer definition specified in application code) or generate a graphical representation object at an offset from the OS pointer. The second pointer file may correspond to an application-level pointer or pointer file provided by a webpage that enables a host to change an appearance of a pointer or other pointer properties, including hot spot definition. The method, apparatus, and system may configure the second pointer file or object to track movement that is input by a user via an input device such as a mouse. The displayed graphic of the pointer and the hidden pointer may move in the same manner but an offset distance from either other, with the hot spot of the application pointer being set to equal or approximate the hot spot location of the OS pointer or equal or approximate an offset applied to application elements.

In some embodiments, the method, apparatus, and system disclosed herein are configured to operate on a client device. In these embodiments, the method, apparatus, and system create and apply the offsets locally for an application before application information is rendered. For example, the method, apparatus, and system may include a plug-in for a web browser or be configured as a stand-alone application. The method, apparatus, and system may also validate the user input locally. The method, apparatus, and system may transmit application data associated with the pointer selection to a server or host of the application if the pointer selection is deemed valid. Additionally or alternatively, the method, apparatus, and system may enable the application data associated with the pointer selection to be provided to the application for local processing if the pointer selection is deemed valid. The example method, apparatus, and system may further cause an alert or alarm to be displayed at the client device (or transmitted in a message to an application server) indicative that a pointer selection has been deemed invalid and/or a malicious application may have made the pointer selection.

In some embodiments, the method, apparatus, and system are configured to operate remotely from a client device. For example, the method, apparatus, and system may be configured within a proxy server between an application server and a client device. In other examples, the method, apparatus, and system are configured as a security feature within an application server. In these examples, the method, apparatus, and system are configured to generate and apply the offsets to the application (e.g., a webpage) before transmission to the client device. In addition, the method, apparatus, and system may update a pointer definition in the application code and/or remotely update the pointer file to apply the pointer offset. Further, the method, apparatus, and system are configured to receive responses from the client device including a location where a pointer selection was made to determine if the selection is valid. If valid, the method, apparatus, and system may transmit the application or page response information to the application server. If the response is invalid, the method, apparatus, and system may transmit an alert and/or alarm to the application server indicative of a presence of malware or a malicious application.

In some embodiments, the example method, apparatus, and system disclosed herein is configured to replace an OS pointer for a fake but realistic looking pointer with a predetermined displacement (and/or displacement function) within a graphical user interface, i.e. at a position that is different from the hot spot where the pointer is defined to be located by the OS. Soft information changes made to an application stack may be used to accommodate the displacement between imposed between OS and application versions of the pointer, where the "hard," required functional programming of the session or application is preserved. For example, example method, apparatus, and system enables a user to fill out form data as the user intended, click to submit the form as intended using the pointer, and have the intended data submitted in a format specified by the server for transmission from a client device to a server that allows the intended functionality of the page to proceed. While the hard, required functional programming is preserved, the delta position of the pointer need not be revealed to the user. The soft information alterations that govern the pointer allow the user to operate the pointer as they intend to, and the page functions as before and to the same end. Hacking and automation tools (and other forms of malware) can be used to "drive" the OS pointer. However the changes made to the soft information in relation to the pointer and the page elements prevent the malware from operating as intended.

The soft information, as disclosed herein, includes changes to how data and graphics are displayed through an application viewed on a screen of a client device. The soft information may be changed within a pointer file and/or application program code (e.g., webpage code). Changes to the soft information do not change the intended functionality of the application or webpage. A first category of soft information includes methods and rules by which the original default OS pointer appears and is made to disappear. For example, the OS pointer may appear or disappear based on proximity to an edge of an application window. A second category of soft information characterizes how a replacement pointer is presented over time during a user's experience, including color, size, shape, and format. For example, pointer colors may be varied based on background, or set to a specific color. Pointer size may be set to 32×32, 64×64, or a different number of vertical and horizontal pixels in a square, rectangle, or other shape specified by a pointer file or application code. The pointer may be formatted as a .png, file, a jpeg file, a base 64 data string, or with another data format. The pointer may be built from canvas, SVG, javascript or any application window attribute with a graphical capability. This presentation may be constant or vary in time and/or position within a window, screen, or page.

A third category of soft information includes methods and rules for where the replacement pointer is positioned relative to the original OS pointer default hotspot. This displacement may be constant or vary in time and/or position within the window, screen or page. A fourth category of soft information governs how the replacement pointer responds to user input. For example, each degree of rotation of a trackball by a user may correspond to a certain number of pixels, such as 0.25, 0.5, 0.75, 1, 2, 3, 5, 10 or another number of pixels of pointer motion. This number may vary in time and position within the window, screen, or page. A fifth category of soft information governs how a replacement pointer interacts with other page elements, including input elements, buttons and links, as it hovers, mouse overs, clicks, mouse downs, or invokes other pointer events. The interaction may vary with the page element, time, and/or position within the window, screen, or page.

Some variations of soft information may break or disable browser functionality. For example, a pointer presented as a 1×1 pixel sized, transparently colored image would not permit a user to navigate within a web page, or interact with any features on that page. Another example of breaking browser functionality arises if pointer motion is altered so that one degree of rotation of a trackball corresponds to a random number of pixels in a random direction of pointer movement. Other soft information changes can break some applications but not others. For example, an all-white pointer would be visible on dark backgrounds, but not on white backgrounds.

Therefore, a final set of soft variations of the pointer element should allow the user to navigate the details of the page as they the user intend. In some instances, the example method, apparatus, and system disclosed herein may perform a verification of the soft information changes to confirm the application or page operates as intended. The method, apparatus, and system may make additional changes if initial soft information changes are determined to change operation of the application or page. In addition, other browser or application elements a page should be able to interact successfully with the pointer as required to permit a page to operate as designed. Moreover, it should be possible to generate the required response for a client browser and OS to send to a coherent, faithful description or summary of the user's intent and/or decision making process to the security device and application server.

This last set of soft variations are said to "preserve the hard information" of the web session. This hard information frequently changes with each page of the web session (for one page it may be that password information arrive at the server, for another page a user's seat selection for a concert ticket may be required by the server for the page to function as intended), but in each case it is minimally required that the server receive verification from the client device that the application's user and the web page elements (including the browsers pointer element, inputs, buttons, links, images, on-screen keyboards, icons, etc.) have interacted successfully to capture the application user's intent and send that information to the server.

The hard information as it relates to the pointer needs to be a coherent, faithful representation of required user input data, consistent with the user's intent. It can be directly or indirectly transmitted from the client device in a properly formatted manner to upstream devices such as a security proxy and application server. For example, if the user is given a floorplan of a concert hall, either the screen coordinates corresponding to seat 7A, or the text "seat 7A" may be transmitted. Once transmitted to upstream devices, user inputs may be processed, and in some cases proceed, to a next page of the application session.

When the soft information is applied to the page, functionality remains intact. The user is able to navigate the altered, modified page as required by the application and as the user intended. For example, if the user wanted to move the pointer to the left by 10 pixels, this can be accomplished with the application of the soft information. The user is able to navigate and provide inputs using the OS provided default keyboard, pointer clicks, trackball and touchscreen via the potentially modified page elements (including "fake" pointer, "fake" on-screen keyboards, "fake" inputs, buttons, forms, etc.), to cause their user's intent to be faithfully processed by the web page programming in the client device. The user is able to cause the transmission of required data for that page (example username and password are required for a login) in a properly formatted way to upstream servers.

Figure 2:
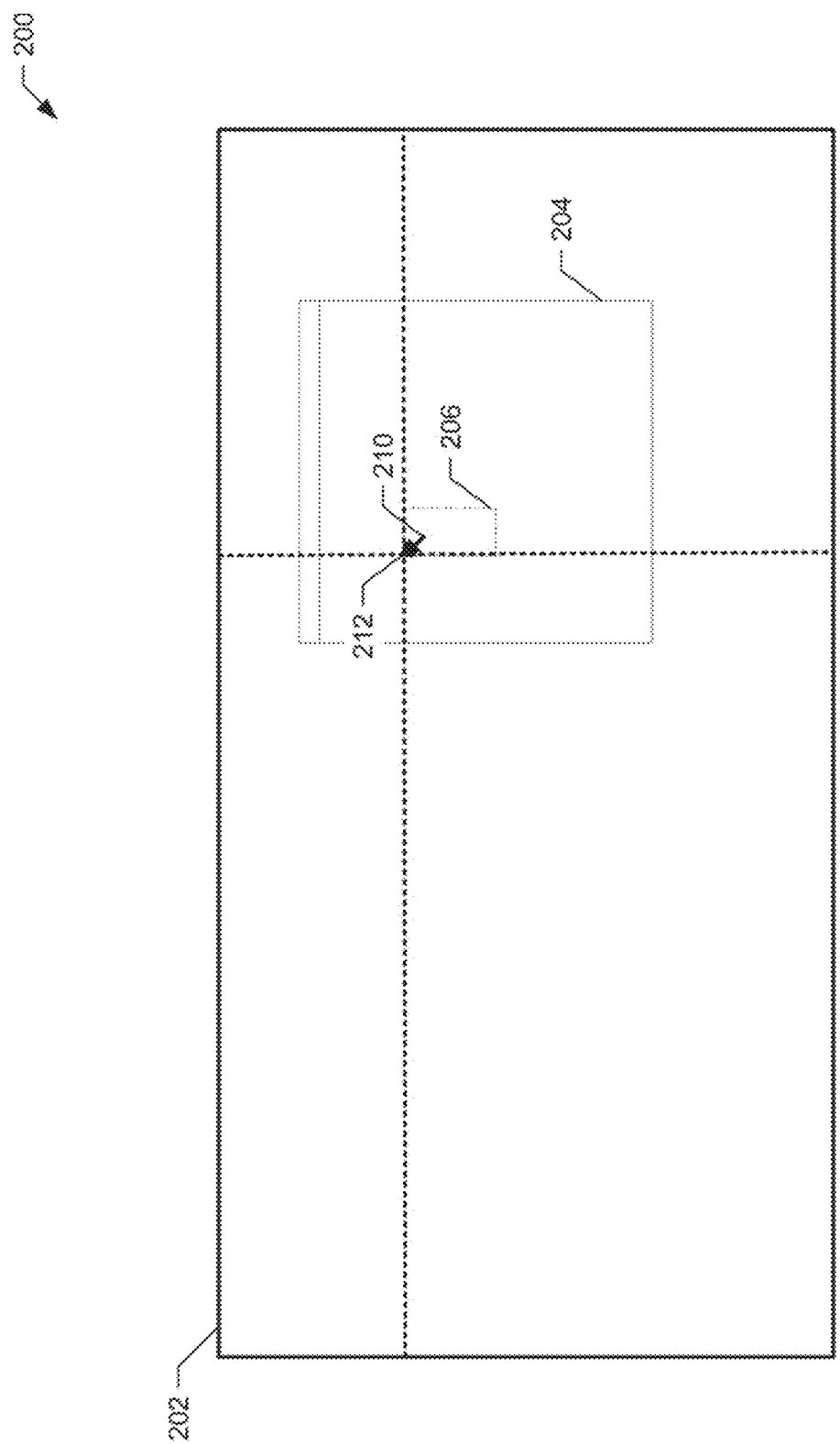
FIG. 2 illustrates a pointer event located by the OS, in which the hot spot coordinates are passed to an application window within a display of a computer screen, according to an example embodiment of the present disclosure.

FIG. 2 shows illustrates a computer screen 202 (e.g., a display area) on a client device 200 having an application window 204 (e.g., an application viewer), and providing a tailored pointer data file image, or more simply "pointer" 206. In the illustrated example, the pointer 206 is configured such that a tip of a pointer 210 is collocated with a hot spot 212. User pointer selections are passed to the OS as the coordinates or location of the hot spot 212. The coordinates may include an x-axis value and a y-axis value of the screen 202 and/or the application window 204.

Figure 3:
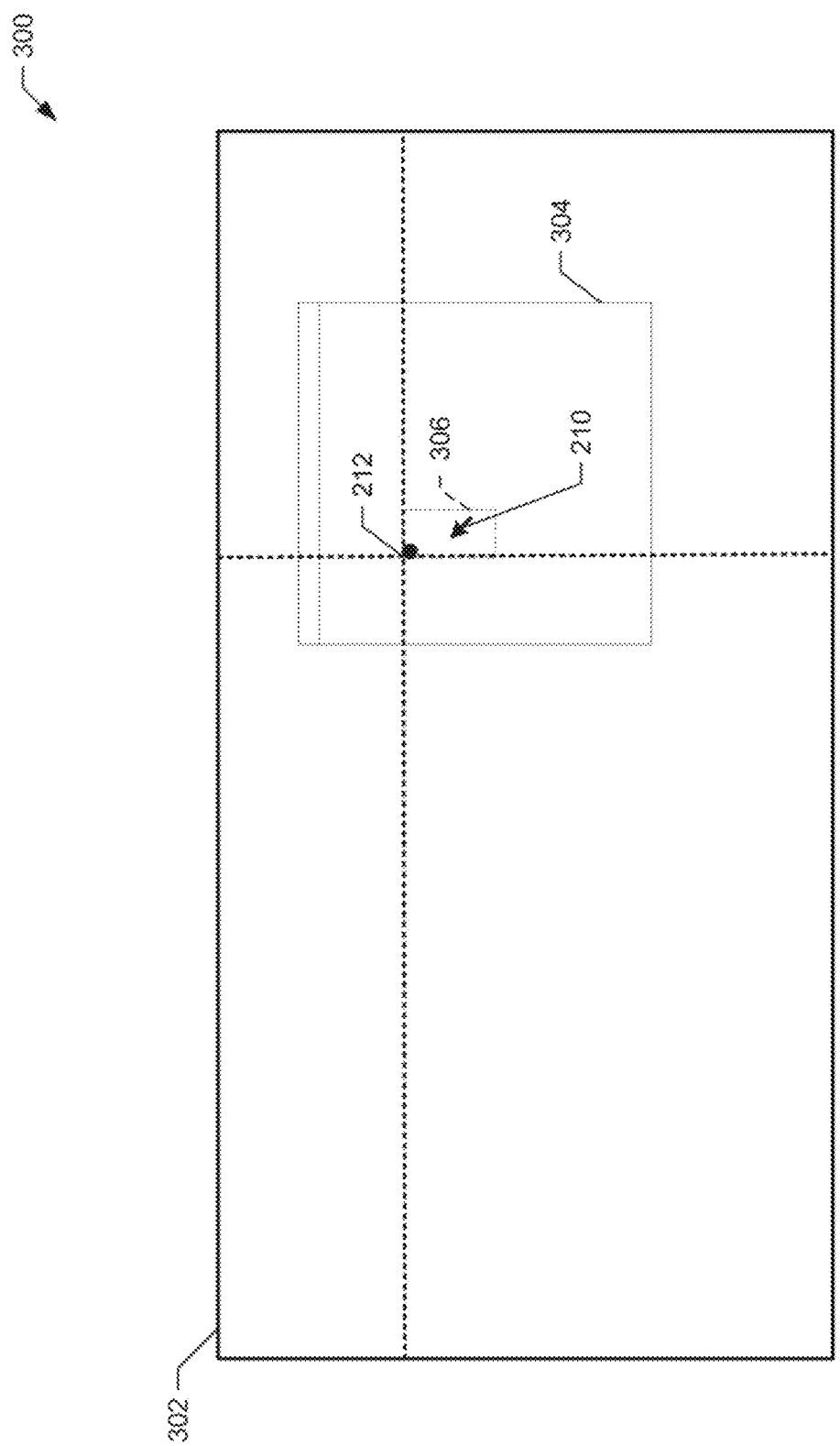
FIG. 3 illustrates a computer screen having an application window in which an application provides a tailored pointer data file image with properties and actions under the control of the application, according to an example embodiment of the present disclosure.

FIG. 3 illustrates a computer screen 302 on a client device 300 having an application window 304, and providing a tailored pointer data file image, or more simply "pointer" 306. The properties and actions of the tailored pointer are under the control of the application. In the illustrated example, the file 306 is modified such that the pointer 210 is displayed within a center of a pixel image. As such, a tip of the pointer 210 is no longer collocated with the hot spot 212. A distance between the pointer 210 and the hot spot 212 corresponds to an offset or offset vector.

The presentation information of the pointer 306 is a custom image together with its styling, positioning within the page, environment, sizing, and other presentation characteristics/properties. Response information governs how the pointer 306 (look-a-like pointer image) responds to user inputs. An example of response information is 1 degree of rotation of the user's trackball corresponds to a predetermined number of pixels of translation of the pointer 306. For example, one degree of rotation of the user's trackball can correspond to 1, 2, 3, 5, 10 or a different number of pixels.

Interaction information sets rules for how the pointer image interacts with other page elements for different pointer events, such as hover, mouse down, and mouse over actions. For example, the username and password information of a login screen that gets transmitted to a server is hard information, but aspects of how the fields are presented or how the pointer image interacts with page elements for different pointer event is soft information. Even after applying soft information a user needs to be able to navigate the page, fill in form data as intended, successfully click on appropriate page element(s), and send click coordinate information to a security engine to gain access to the next page of a web session.

The user expectation of the pointer 306 within the operating system default settings for the computer screen 302 can diverge from the default settings of the application window 304. The user expectation of the pointer 306 or icon location determines or leads to the user interaction with a page provided by the application window 304. The divergence (displacement or offset) allows for detection by the computer of a pointer generated by the operating system and pointer driver software ("OS pointer") or pointer 306 guided by a human, via a computer input device such as a mouse, trackpad, trackball, keyboard, or the like. In other words, the pointer 306 generated by the application window 304 can diverge from a pointer generated by the operating system and pointer driver software for generating a pointer on the computer screen 302.

In some implementations, OS level malware may guide the hot spot 212 within the application window 304 according to operation system default parameters. Accordingly, a system can detect when such malware is being executed by using a divergence known to the application and its window. The divergence can be determined by the computer, and configured to be protective of application function.

FIGS. 1A and 2 illustrate an example of a pointer within 32×64 pixel image file representative of the type of image file painted by the operating system onto the monitor at a typical periodic update time (e.g. 60 Hz.). FIGS. 1B and 3 illustrates a data file tailored by the application window (e.g. browser), in which case the arrow icon and operating system (OS) hot spot are not collocated. In the example of FIGS. 1A, 1B, 2, and 3, the offset, a divergence or displacement between the OS and application pointers is the distance between the origin (0,0) in the default data file and (16, 22) in the tailored data file, indicating a horizontal displacement of 16 pixels and a vertical displacement of 22 pixels. Each of the vertical and horizontal displacements can be constant throughout the application window, or they can vary. In a first set of embodiments, the displacements are constant over at least a portion of an application window. In a second set of embodiments, the displacements vary as a function of location. In a third set of embodiments, the displacements vary as a function of time. In a fourth set of embodiments, the displacements vary as a function of time and location. The following paragraphs describe these four sets of embodiments.

In the first set of embodiments, the displacements in the horizontal and/or vertical dimensions are constant over a region within the application window, or over the entire application window. For example, the OS and application pointers may be displaced from each other by 1, 2, 3, 5, 7, 10, 15, 20, 25, 30, 40, 50, 80, 100, or a different number of pixels in the horizontal and/or vertical dimension. The number of pixels of displacement can be the same or different for the two dimensions over the region within the application window, or over the entire application window. Such constant displacements are known to the application, for example a browser, but may not be known to the operating system, and may not be known or predictable to an external malware agent.

In the second set of embodiments, the displacements (offsets) vary as a function of location. For example, the displacements in the horizontal and/or vertical dimensions can converge towards zero at edges of the application window, and have higher displacements away from the boundaries. The displacements may vary in the horizontal and/or vertical dimensions according to one or more sinusoidal or other geometric functions. The displacements may follow a linear, piecewise linear, curvilinear, or sinusoidal function, or any combination thereof. For example, the horizontal (x) and vertical (y) can be defined as:

$$x_{offset} = \sin\left(\frac{\pi x}{w}\right),$$

where w is the width of the browser window in pixels, and $$y_{offset} = \sin\left(\frac{\pi y}{h}\right),$$

where h is the height of the browser window in pixels. This is just one representative function that may be applied to determine horizontal (x) and vertical (y) displacements. Other functions that, for example, are included in math libraries may be applied, such as absolute value, other trigonometric functions, logarithmic, power, exponential, random, and square root. Functions can be applied singly or in combination.

The displacements may be continuous functions, or may include jump discontinuities. The displacements may have one or multiple local minima and/or maxima within the application window. The displacements may be scaled by a randomized factor. The displacements may be discretized or rounded to an integer number of pixels. The displacements can be constrained to maximum and or minimum displacements with a region, or over the entire application window.

The functions, as well as the number of pixels of displacements, can be the same or different for the two dimensions over the region within the application window, or over the entire application window. Such functions and displacements are known to the application, for example a browser, but may not be known to the operating system, and may not be known or predictable to an external malware agent.

In the third set of embodiments, the horizontal and/or vertical displacements vary as a function of time. For example, the horizontal and/or vertical displacements can be adjusted or scaled based on the time since the window was painted, by a randomized time factor, or based on the current timestamp. Such temporal variations are known to the application, for example a browser, but may not be known to the operating system, and may not be known or predictable to an external malware agent.

In the fourth set of embodiments, the displacements vary as a function of both time and location, by combining aspects of the second and third sets of embodiments described above.

Figure 4A:
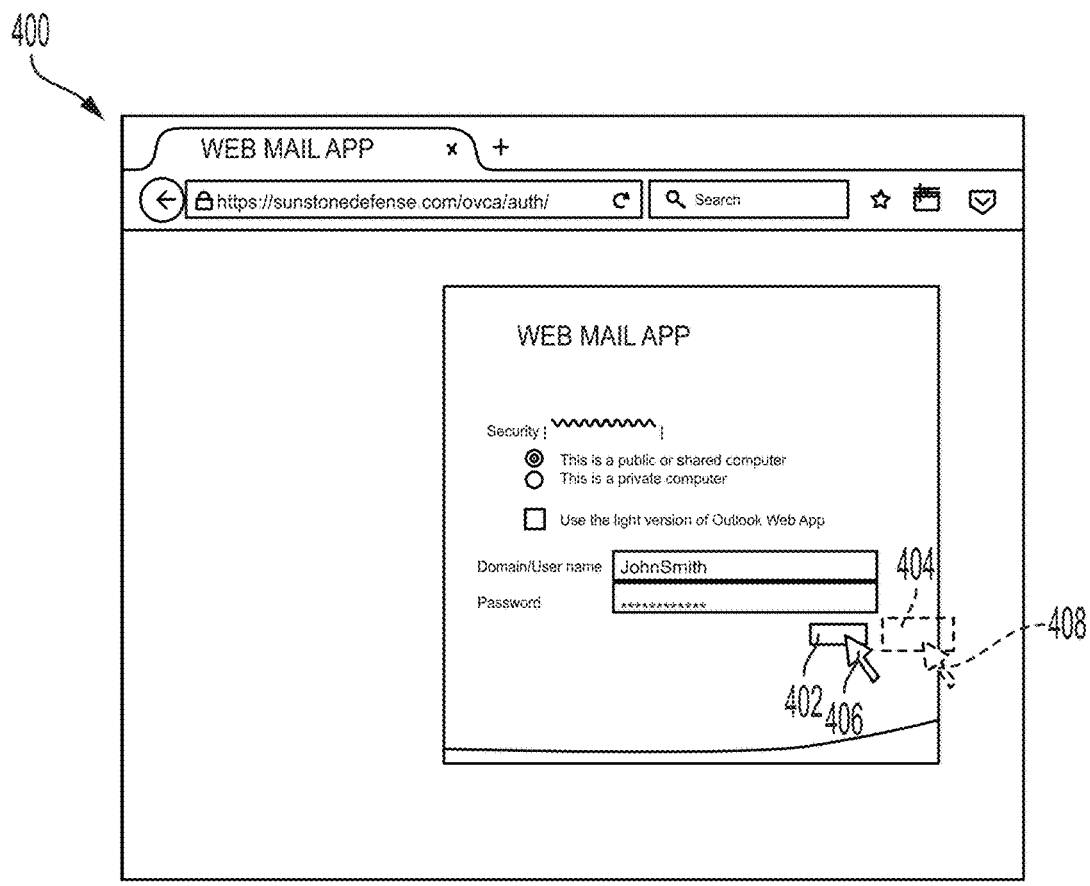
FIG. 4A illustrates how an authorized visual user selects a sign in button using a tailored pointer data file image, according to an example embodiment of the present disclosure.

FIG. 4A illustrates how several sources of soft information changes depicted through reference numbers 402, 404, 406, and 408 are configured together so that hard information flow of the page is preserved and how an authorized visual user selects a sign in button using a tailored pointer data file image. The visual user sees the application pointer 406 (e.g., a tailored pointer) that was rendered by the browser to look like a pointer. The displaced operating systems pointer 408 is hidden (not displayed) by the browser, so that it is not visible to the user. In this example, the offset is between the pointer 408 and the tailored pointer 406. Similarly, the button 402 rendered by the browser is displaced from a hidden (not displayed) clickable button 404. The button 402 is displaced by the same distance as the displacement of the pointer 406. The hidden pointer 408 and hidden clickable button 404 correspond to step 940 of FIG. 9. Purposeful selections of soft information that when taken together with the soft information changes depicted in 402 and 406 all mesh together to enable page function and ensure that the hard information corresponding to the user supplied data inputs and other automatically supplied data field types, such as cookies and session ID numbers, are ultimately able to be transmitted and read by a server that provided the application or webpage 400 whenever the user is ready to transmit their data. The rendered application pointer 406 and button 402 are artifacts in the page 400 created by varying the soft information properties of the page's original OS pointer icon and form submit button displayed to the user in a style, color, or location that may vary without impacting the ability of the client device and server from exchanging the necessary hard information corresponding to required data as the client intended and within the original scope of the application's design. That is, in sum total, after all changes have been made, the web page functions. When the visual user moves the soft browser pointer 406 icon over the soft browser sign in button 402 and clicks the mouse, the invisible OS pointer 408 is over the invisible application sign in button 404 and activates the sign in the button 404 once the user (unknowingly) directs the OS pointer to send a click event at the location of the non-visible button 408. The user believes they have sent a click event at 402 using 406. As a result, the visual user successfully signs on.

Figure 4B:
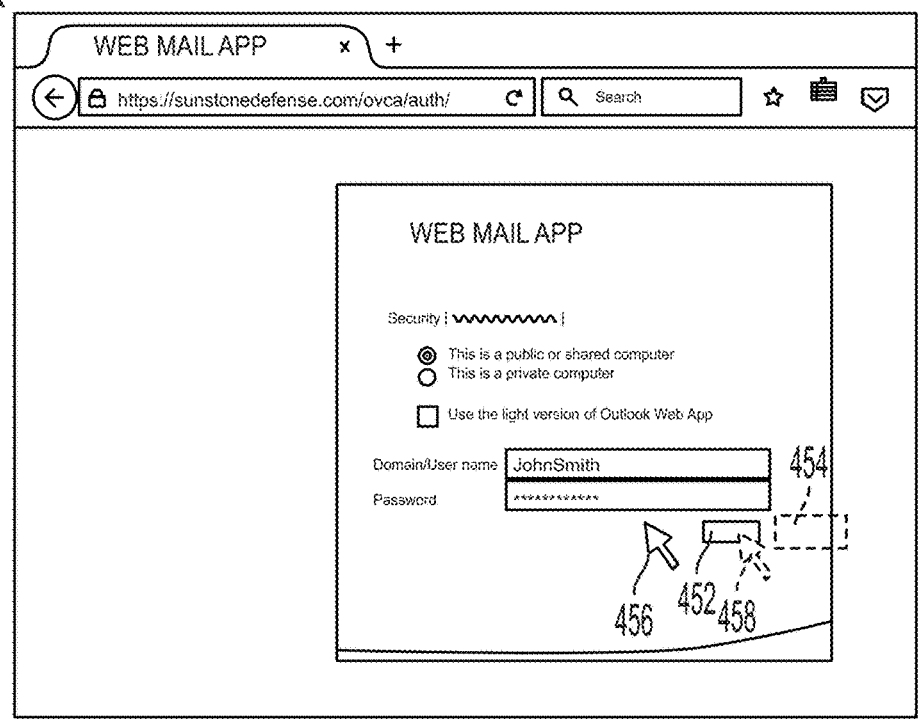
FIG. 4B illustrates how an unauthorized malware user is detected when attempting to select the sign in button of FIG. 4A, according to an example embodiment of the present disclosure.

In contrast, FIG. 4B illustrates how an unauthorized malware user selects a sign in button 404 using a tailored pointer data file image within an application 450. The unauthorized malware user does not know, a priori, that soft information changes 452, 454, 456, 458 have been introduced into the application 450. The soft information change depicted in pointer 458 causes the OS pointer to be rendered invisibly to the user. Soft information change depicted in pointer 456 causes a look-a-like pointer image to appear at a horizontal displacement from the pointer 458. Soft information changes depicted in hidden button (location of a selectable function) 454 alter the visibility of the page's original submit button to a non-visible state as well as introduce a displacement of the button from its original position by the same horizontal displacement adopted between pointers 458 and 456. Soft information change 452 introduces an image that looks like a button at the original position of the pages submit button. Taken together these soft changes preserve the functionality of the page and so ensure that the necessary hard information flow is preserved for the real user (FIG. 4A), and that the malware user is detected. There is a horizontal displacement between the OS pointer 458 and the application pointer 456. The malware user moves or drives the real OS pointer 458 over the fake (image replica) of a form sign on button 452. The location and possibly the styling of the original clickable button have been altered. The malware clicks on the picture of the button 452 with the OS pointer 458, which does not correspond to the location of the hidden OS button 454 (or function). As a result, the malware user is not able to sign in.

Therefore, after providing username and password credentials, the divergence between the OS and application window pointers may result in a user "clicking" on an empty section of the web page rather than the provided "Sign-in" button, or selection of a security element that triggers an alert. The substitution of the application level pointer and its divergence from the operating system pointer have actively caused malware to be detected. This type of detection is not made by passive observation and analysis of collected data but rather actively caused to happen by applying a simple understanding the intent of the authentication form (fill in fields, click the button) and the malware user's inability to navigate the substitution of pointers to complete the authentication process. In this example, the malware is defeated. Embodiments that randomize or vary the displacement, or take other measures described herein, make it more difficult for malware operate the system.

FIGS. 4A and 4B are therefore illustrative of implementations on modifying soft information: presentation information of the browser's pointer as a custom image supplied by the present invention (presentation of the OS pointer as non-visible), response information governing how the look-a-like pointer image responds to user, and interaction information regarding how the pointer image (the look-a-like submit button and displaced the original submit button) interact (hovers, mousedown, mouseovers, etc. are examples of this) with other page elements. These page elements may have been part of the original page or added to the page by the present invention for example the element 406. These soft alterations were specifically chosen in order that they work together in unison to preserve the original functionality of the page. Because the altered page logic fulfills the same roles as the original page logic one is assured that the hard information flow (for example the necessary site cookies, data fields, session tokens, etc., that are necessary for effective communication between client and server devices, and also fulfilling the intent of the server application) is also preserved. The username and password information example of FIGS. 4A and 4B are an authentication example in which the username and password information gets transmitted to the server as intended by the client. FIGS. 4A, 4B also illustrate how a button gets the click, or an input or password box gets the click. While the buttons in FIGS. 4A and 4B are login buttons, some embodiments of the disclosed technology use other buttons or other screen widgets. In some embodiments, the button can be a one-click ordering button to purchase an item. In some embodiments, the button can be replaced with an image of a triangle to be selected by a user to verify that user, as opposed to machine, interaction.

Figure 5:
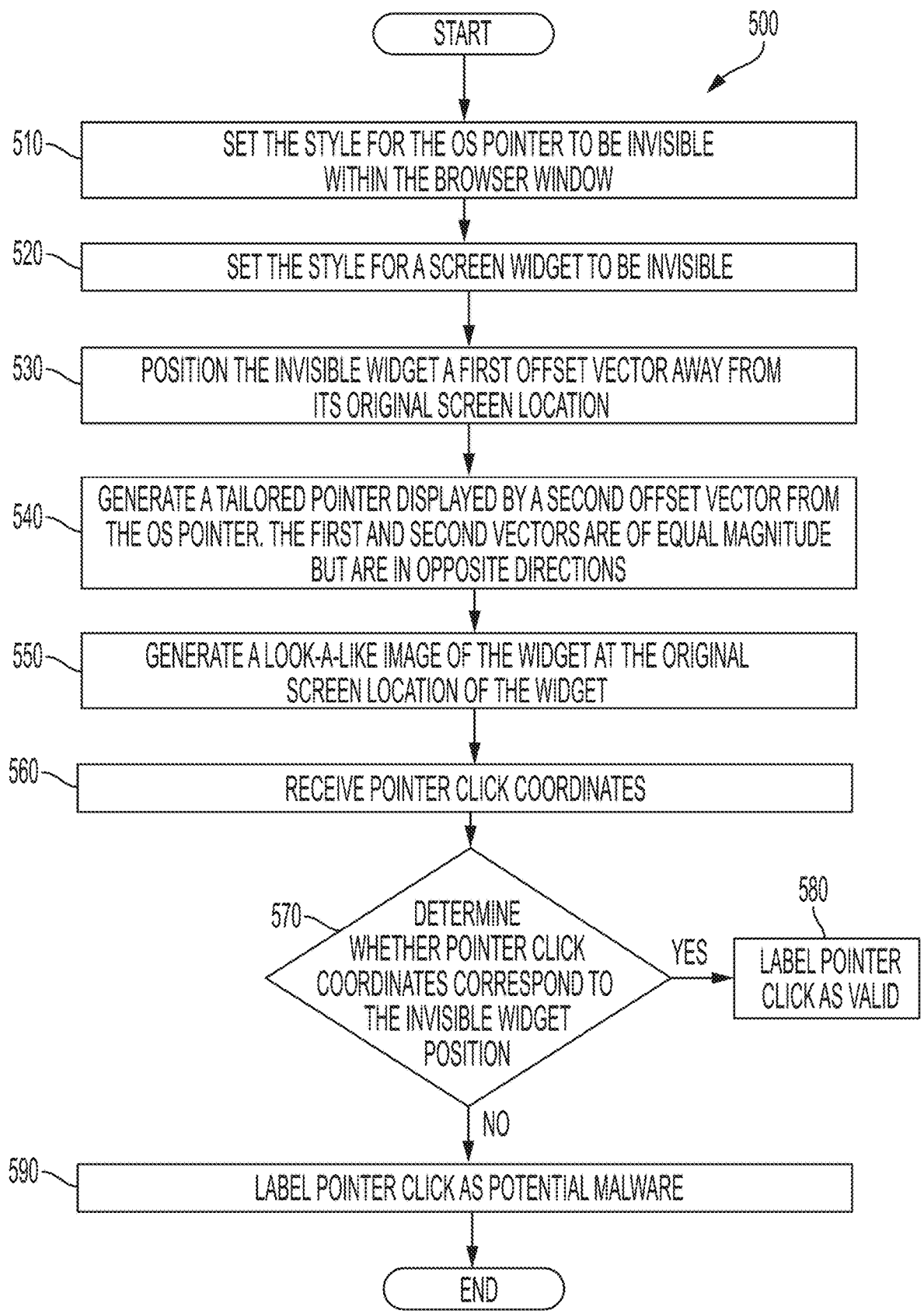
FIG. 5 illustrates a flowchart of a method to identify a click as either valid or potential malware, according to an example embodiment of the present disclosure.

FIG. 5 is a flowchart of a method to identify a click as either valid or potential malware. Although the method 500 is described with reference to the flow diagram illustrated in FIG. 5, it will be appreciated that many other methods of performing the acts associated with the procedure 500 may be used. For example, the order of many of the blocks may be changed, certain blocks may be combined with other blocks, and many of the blocks described are optional. For example, additional or different blocks may be executed in embodiments where coordinates or a location of a function of an application or input device element are moved and/or a pointer file is modified to change a location of a displayed pointer within a pixel area.

The method 500 can be used to distinguish between the valid user of FIG. 4A and the malware user of FIG. 4B, described above. In block 510, method 500 sets the style for the OS pointer to be invisible within the browser window. FIGS. 4A and 4B illustrate the invisible OS pointer with dashed lines. In this example, method 500 uses a mouse to position a pointer on a screen. A trackball, keyboard command, touchpad, voice input, touchscreen, or equivalent forms of local user input can be used by method 500 to position a pointer on the screen.

In block 520, method 500 sets the style for a screen widget to be invisible. In the examples of FIGS. 4A and 4B, the screen widget is a button. Other screen widgets or page elements that can be used by method 500 include radio buttons, check boxes, split buttons, cycle buttons, sliders, list boxes, spinners, drop down lists, menus, and tool bars.

In block 530, method 500 positions the invisible widget (or function of an application), such as a button, a first offset vector away from its original screen location. For example, in FIGS. 4A and 4B, the invisible button is offset to the right of its original location by 30 pixels.

In block 540, method 500 generates a tailored pointer displaced by a second offset vector from the OS pointer. The first and second offset vectors are of substantially equal magnitude, but are in opposite directions. For example, in FIGS. 4A and 4B, the tailored pointer 406 and 456, respectively, is offset to the left of its original location by 30 pixels, of equal magnitude (30 pixels) and opposite direction (left vs. right) of the first offset vector. As the OS pointer 408 and 458, respectively, moves (invisibly), the look-a-like tailored pointer image 406 and 456, respectively, moves with it. As noted above with respect to FIGS. 1A and 1B, the offset vector can be of constant magnitude and direction, may vary as a function of position, may vary as a function of time, or may vary as a function of both position and time.

In block 550, method 500 generates a look-a-like image of the widget at the original location of the widget. In the example of FIGS. 4A and 4B, the widget is a sign-on button. In various embodiments, method 500 may apply a different style to the look-a-like image of the widget. The look-a-like image of the widget and the tailored pointer are "soft" information. By painting the look-a-like image of the widget at the original location of the widget, both valid users and malware users who capture a display screen will view the look-a-like image in the original location, even though the "real" invisible widget is offset from that location.

In block 560, method 500 receives pointer click coordinates. The pointer click coordinates may be from a valid local user, an authorized remote user, an invalid remote user, or malware user. Valid local users will click on a user interface, such as a mouse, trackball, touchpad, touchscreen, keypad, keyboard, or voice entry. Valid users will click when the tailored pointer 406 position corresponds to a location of the look-a-like widget 402. As a result, the invisible OS pointer 408 position will correspond to the position of the invisible widget 404. In contrast, an unauthorized remote user or malware unaware of the pointer offset would feed pointer positions to the OS pointer queue corresponding to the original widget position instead of the offset invisible widget position.

In block 570, method 500 determines whether the pointer click coordinates correspond to the invisible widget position. If they are, in block 580 method 500 labels the click as valid. If not, in block 590 method 500 labels the click as potential malware. Method 500 may return to step 560 one, several, or up to a threshold number of times before concluding a malware user is trying to gain access. Method 500 may label a click as potential malware if the pointer click coordinates correspond not only do not correspond to the invisible widget portion, but they do correspond to original screen location of the widget. In some embodiments, the method 500 may generate an alert and/or an alarm if a threshold numbers of times have been reached.

In some embodiments, the offset between the invisible OS pointer and the tailored pointer varies as a function of screen position (x, y) and time since the page was loaded (t). In some embodiments, the offset converges to 0 as the invisible OS pointer approaches a border of the browser window. This boundary condition does not impact the ability to detect malware; instead it provides a consistent viewing experience when crossing boundaries, as within the browser window the tailored pointer is visible, but outside of the browser window the OS pointer is visible. This boundary condition avoids sudden shifts in pointer location that could be used to predict offset values.

In addition to these and other position and time factors, the offset can be varied as a function of user action. For example, if the user moves the mouse quickly, method 500 can slow down the motion of the picture, to reduce sensitivity of the look-a-like picture motion to the OS motion. In some embodiments, the tailored pointer position can be changed as the user interacts with the application, for example by typing keystrokes, moving a mouse rapidly, scrolling the window, watching a video, or reading an article, pop-up or other page content. The disclosed technology takes advantage of the fact that a legitimate user may likely be distracted while performing certain (inter)actions. By having the pointer disappear from one location and reappear in another (or fading out and fading in) during these moments, it is simultaneously more difficult for malware to predict pointer position, and less burdensome with regard to the user experience of legitimate users.

In some embodiments, the style of the tailored pointer and/or the widget can be changed as a function of time or user action. For example, after five seconds of user inaction, which can be interpreted as the user being distracted or reading screen content, the tailored pointer can fade out, and reappear when the user moves (or "shakes") the mouse, making it more difficult for malware to predict pointer position.

Figure 6A:
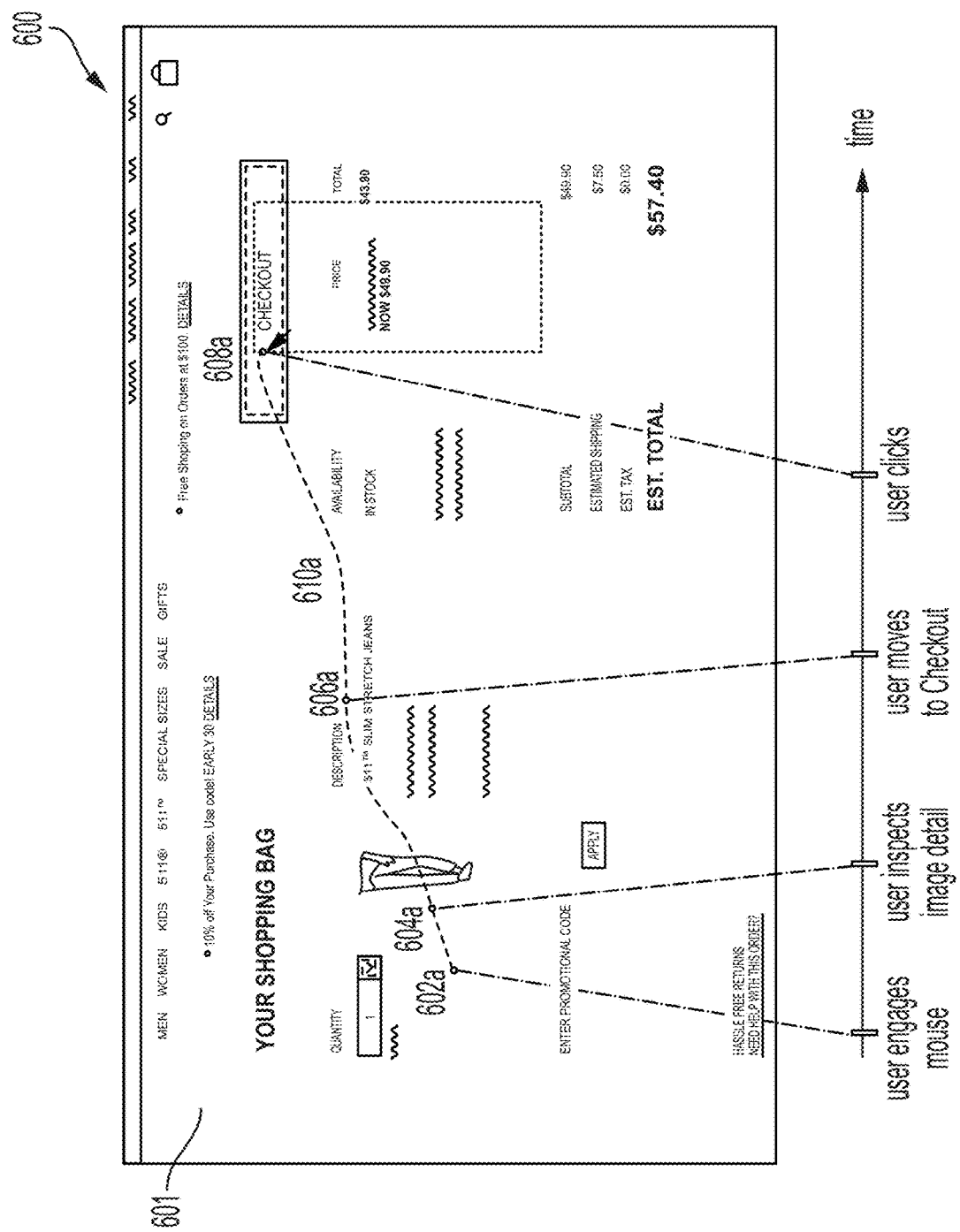
FIG. 6A illustrates a trajectory of a pointer by an authorized visual user in an application window, according to an example embodiment of the present disclosure.

FIG. 6A illustrates a trajectory of a pointer by an authorized visual user in an application window 601 on a client device 600. In FIG. 6A, a typical human trajectory 610a for controlling a pointer in an application window 601 under default conditions by an operating system is shown. The application window 601 represents a typical e-commerce internet provided window generated in a webpage or other electronic transactional application. The trajectory 610a shown illustrates when a user engages the mouse (i.e. the pointer via an input device such as a mouse, trackpad, etc.) at 602a, inspects an image detail at 604a, moves to a "checkout" button (i.e. button, link or tab, etc.) at 606a, and then clicks on the final "checkout" button at 608a.

Figure 6B:
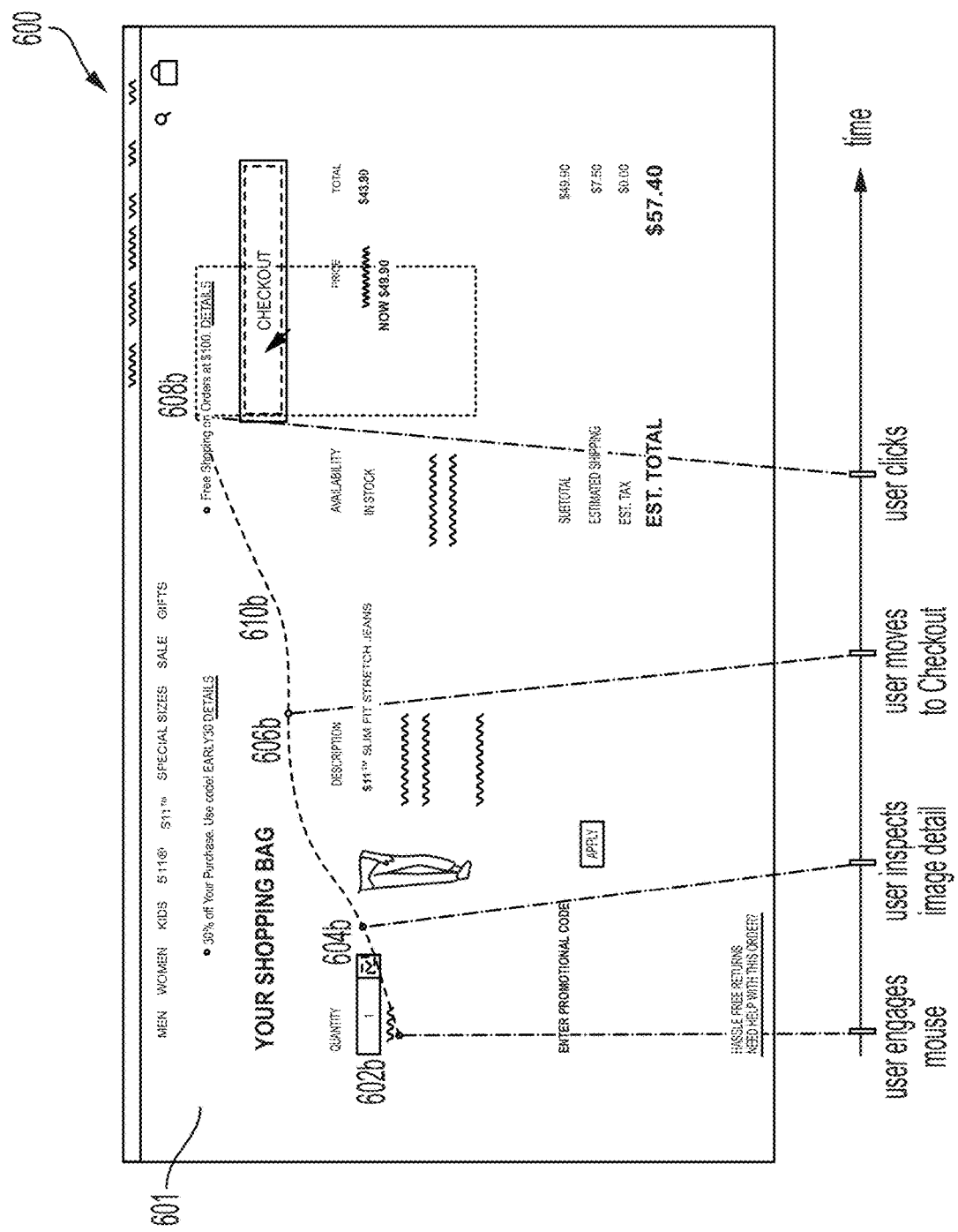
FIG. 6B illustrates a trajectory traced by the OS hot spot as malware or an unauthorized non-visual user performs the actions from FIG. 6A with the look-a-like pointer, for which the final location of the OS hotspot is not over a "Checkout" button, according to an example embodiment of the present disclosure.

FIG. 6B illustrates the trajectory 610b traced by the OS hot spot as malware or an unauthorized non-visual user performs the actions from FIG. 6A with the look-a-like pointer, for which the final location of the OS hotspot is not over the "Checkout" button. Malware or other computer-implemented software may operate within the parameters of the operating system, while the application is actually running divergent to the operating system, such that the steps a user takes in the operating system would be offset from the steps necessary to take in the application window, and such that a misalignment of the malware of the pointer would be indicative of a computer-implemented malware process that is executing on the computer. The trajectory 610b shown illustrates when a malicious user or application engages the mouse/pointer via the OS at 602b, inspects an image detail at 604b, moves to a "checkout" button (i.e. button, link or tab, etc.) at 606b, and then clicks on the final "checkout" button at 608b.

Figure 6C:
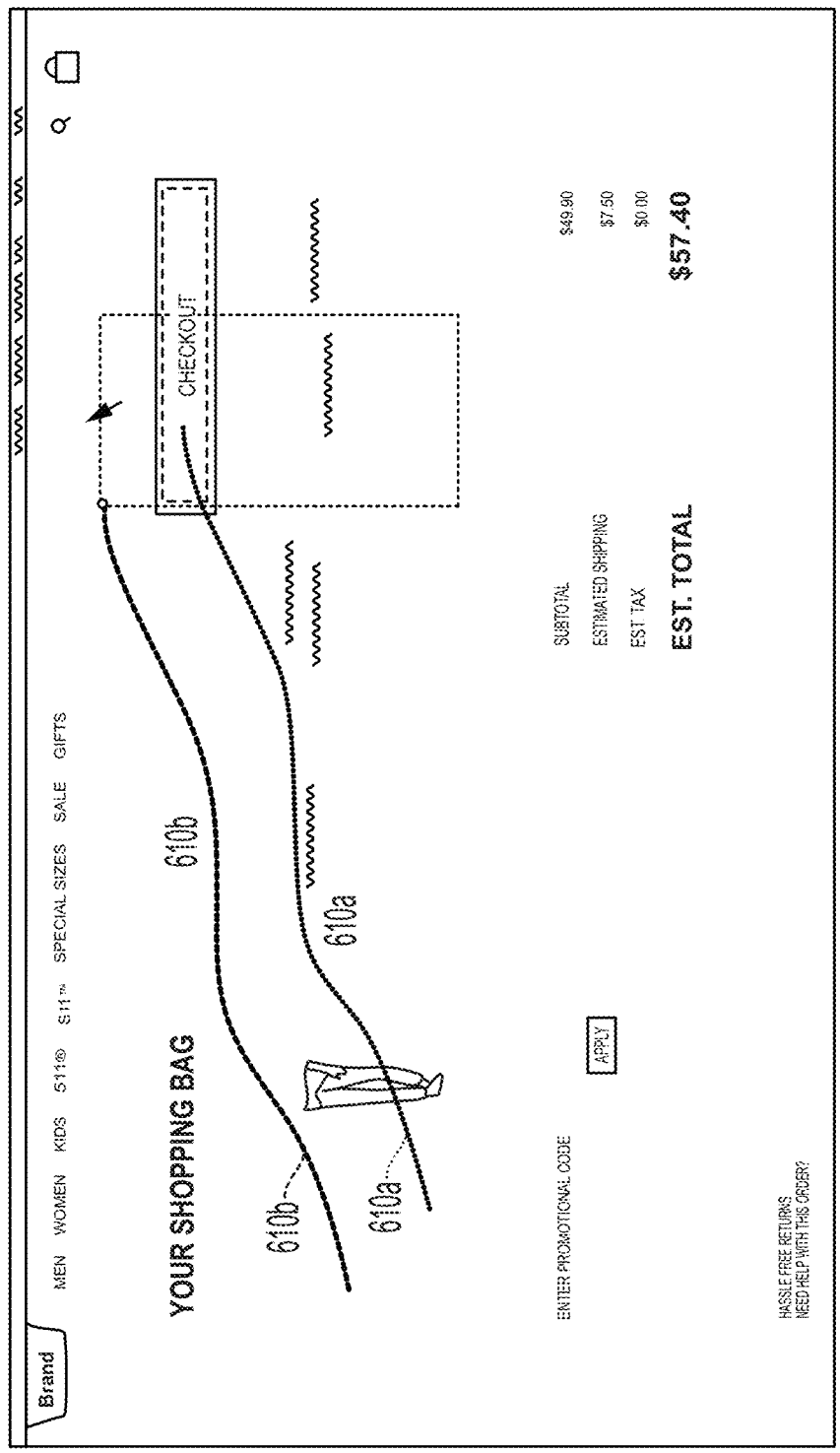
FIG. 6C illustrates the difference in trajectories traced by a local authorized user of FIG. 6A and a malware user of FIG. 6B, according to an example embodiment of the present disclosure.

FIG. 6C illustrates the difference in trajectories traced by a local authorized user of FIG. 6A and a malware user of FIG. 6B. FIG. 6C is an aggregate of the different pointer trajectories induced by the "tailored" pointer, where user behavior is tested invisibly, so as to indicate a potential non-human, computer-implemented malware process that moves the pointer. A human user operating the computer within the application would provide a pointer trajectory as shown in trajectory 610a, while a malware or automated program manipulating the pointer via the OS is shown in trajectory 610b. While these trajectories assume a common sensitivity, i.e., how far the pointer moves (1×, 2×, 10×, etc.) in response to ball rotation, the sensitivity parameter can be adjusted at runtime of the browser-generated and/or OS-generated pointer to provide a further divergence or delta in their respective movements within the graphical user interface. FIG. 6C also demonstrates the disclosed technology's ability to purposefully engineer an alteration of user telemetry data, as opposed to the passive observation of user telemetry data.

FIG. 6C illustrates a constant spatial offset between the OS pointer and the look-a-like replacement pointer. It graphically depicts what the pointer trajectory might look like over time when the constant spatial offset, previously shown in FIGS. 4A and 4B, is implemented. This constant spatial offset is an example variation of the soft information that may be used to create a malware detection scheme. The disclosed technology includes each of the other soft information variations described herein, both singly and in combination.

By drawing from multiple variations, a wide variety of detection methods are available to detect malware. These methods can be varied and chosen unpredictably, so that a malware user would not be able to predict the soft information variation. This is similar to a malware agent knowing that a password is required to enter a system, but not being able to predict a long and complex password because there are so many possibilities. The set of soft variations includes more than the examples of FIGS. 4A, 4B and 6C. It also include the (soft) presentation information variations, (soft) response to user information variations, and soft interaction with other page elements information variations. These variations may vary in time, with pointer position, and in response to each other.

The relative spatial offset can be constant, or vary as a function of time and screen position. Relative positioning may also vary based on the user interacting with other page elements. For example, the offset may change after the user begins using the keyboard. The way that the look-a-like pointer is styled or presented may vary in space and time, as well as based on user interaction with other page elements or user inputs via a keyboard, trackball, or mouse. Input controls that may be (soft) varied include pointer sensitivity settings, pointer momentum settings, pointer stickiness settings, and pointer lock settings. The way that the pointer is styled, positioned, responds or interacts may be based on the spatial trajectory the pointer has taken across the window, the elements interacted with as it traveled across the window.

Figure 7:
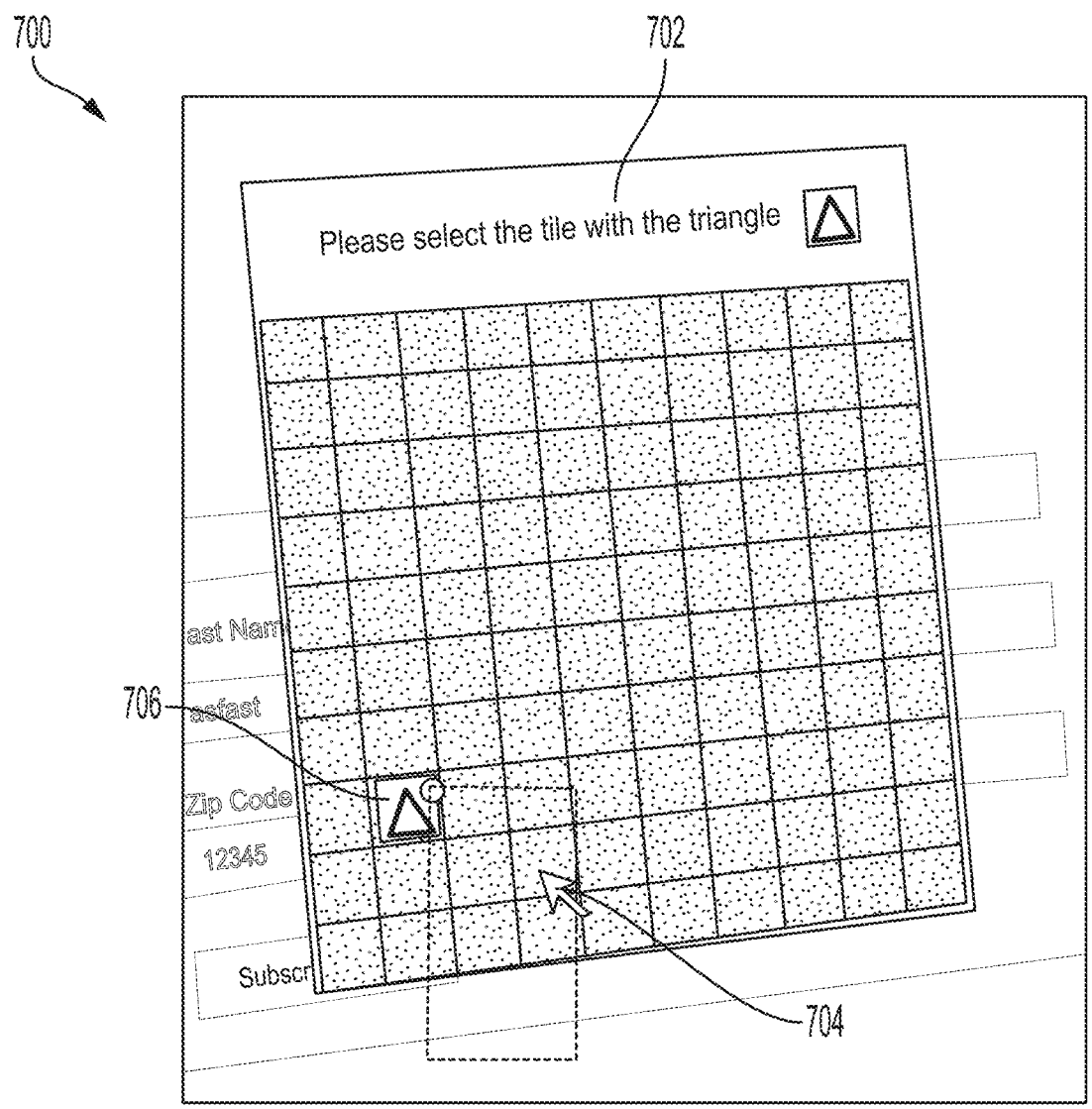
FIG. 7 illustrates an application of a tailored pointer in accordance with some implementations, according to an example embodiment of the present disclosure.

FIG. 7 shows an application of a tailored pointer in accordance with some implementations, in a program that protects websites from malware by requesting user behavior that cannot be accomplished by a computer programmed "bots," such as is currently provided in the industry by a test known as a "Captcha." As shown in FIG. 7, the graphical user interface 700 of a client device provides a test 702 with a familiar captcha like format (on purpose), but the challenge is not based on ability of AI to learn or recognize image based representations of "street signs". The triangle image 706 is defined on the page and provided freely in the caption. The test is simply that there is a spatial (or time-based) delta between the OS and browser pointers 704. Therefore, users are not burdened with additional cumbersome questions to validate that they are legitimate users. They may not even be aware that they are being questioned, as in many embodiments they are using an application as they always have, as the application web pages are used by the disclosed technology.

A pop up window using at test as shown in FIG. 7 can be used for a variety of applications, without needing customization for different applications. For example a bank and a department store may have sign in buttons on the upper right and center of a web page. While these pages can be adapted using the disclosed technology, including tailored pointer and look-a-like widgets on in the upper right and center of their respective web pages. Position testing can be done using a separate pop-up page common to both the bank and the department store, such as the triangle selection window of FIG. 7.

As shown in FIG. 7, because the distance between the pointer 704 and the hot spot 706 may cause an undesirable user experience, keeping the pointer close is a convenient "fix". If the pointer image remains close to the hot spot however not all of the 100 tile choices in the challenge shown can be utilized. One way to mitigate this is to apply a mathematical function with the defining property that the divergence between the OS pointer and application supplied pointer is at a maximum when the OS hot spot is located in the center of the application window and the divergence draws to a minimum as the OS hot spot approaches the boundaries of the applications window.

Figure 8:
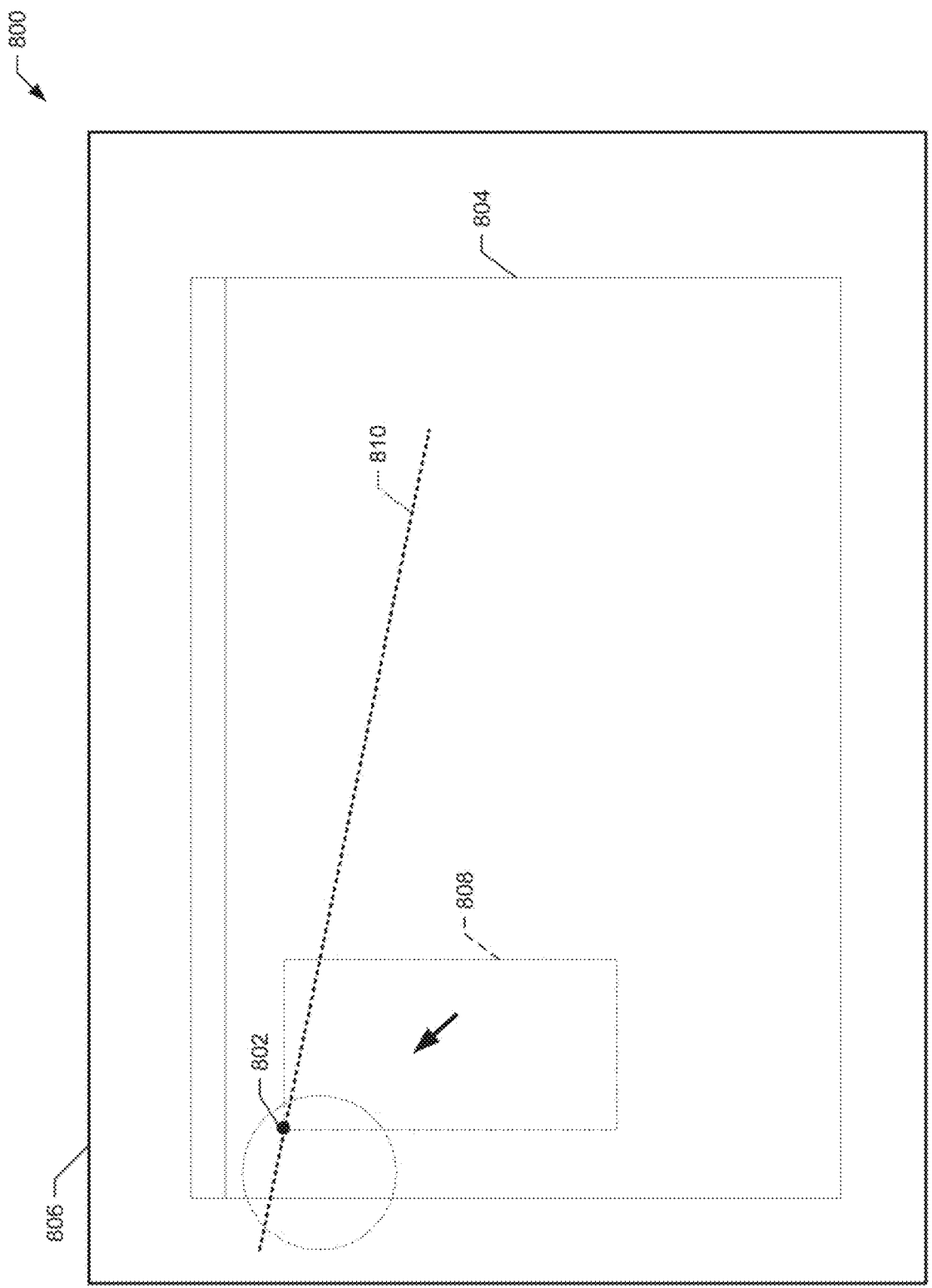
FIG. 8 illustrates an alternative implementation of an application of a tailored pointer, according to an example embodiment of the present disclosure.

FIG. 8 shows an alternative implementation of an application of a tailored pointer. As the OS pointer hot spot 802 crosses the boundary of the browser window 804 into the OS "desktop" 806 of a client device 800, the browser loses its ability to control the pointer image 808. The OS pointer once again takes control. The user experiences an abrupt "jump" in the pointer movement as the border of the browser window is traversed, as it follows pointer trajectory 810. Examples where this may occur include when the user wishes to resize the browser window with the pointer, the user wishes to use the scroll bars in the browser window; or the user wishes to move the pointer into another application's window.

Figure 9:
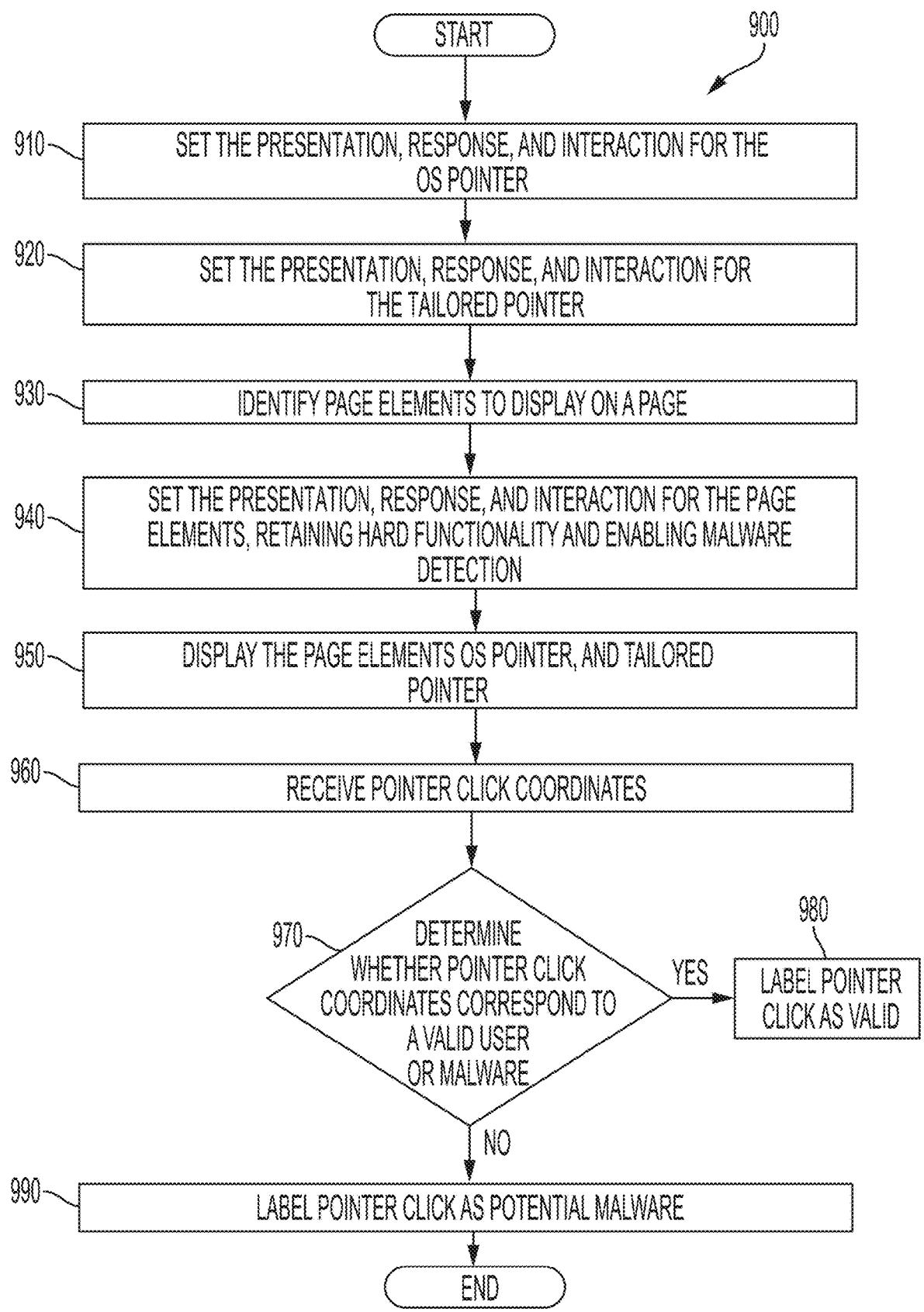
FIG. 9 illustrates a flowchart of a method to identify a click as either valid or potential malware, according to an example embodiment of the present disclosure.

FIG. 9 is a flowchart of a method 900 to identify a click as either valid or potential malware. Although the method 900 is described with reference to the flow diagram illustrated in FIG. 9, it will be appreciated that many other methods of performing the acts associated with the procedure 900 may be used. For example, the order of many of the blocks may be changed, certain blocks may be combined with other blocks, and many of the blocks described are optional.

The example method 900 can be used to distinguish between a valid user and a malware user by modifying soft presentation information, soft response information, and/or soft interaction information for the tailored pointer. In block 910, method 900 sets the presentation, response, and interaction for the OS pointer. The pointer click coordinates may be from a valid local user, an authorized remote user, an invalid remote user, or malware user. Valid local users will click on a user interface, such as a mouse, trackball, touchpad, touchscreen, keypad, keyboard, or voice entry. Valid users will click when the tailored pointer 406 position corresponds to a location of the look-a-like widget 402. As a result, the invisible OS pointer 408 position will correspond to the position of the invisible widget 404. In contrast, an unauthorized remote user or malware unaware of the pointer offset would feed pointer positions to the OS pointer queue corresponding to the original widget position instead of the offset invisible widget position.

Method 900 sets the soft information of the page for the OS pointer inside the browser. Soft presentation information includes layout, color, size format, opacity, shape, iconography and other factors. Soft response interaction includes how it reacts to user input, user input rates, trackball rotations, as well as pointer sensitivity, momentum, stickiness, pointer lock, and keyboard inputs. The soft interaction information includes how the OS pointer interacts with other elements of the page, such as input boxes, links, buttons, page boundaries, images, and other page elements. The soft information for the OS pointer can be varied in ways that are not predictable to a malware user, but do not adversely impact the hard information and/or operation of the page. A malware user would not know what presentation, response and interaction for the OS pointer to expect, making it difficult for a malware user to spoof the application and enter valid information or select a valid entry with the correct coordinates. A trackball, keyboard command, touchpad, voice input, touchscreen, or equivalent forms of local user input can be used by method 900 to position a pointer on the screen.

In block 920, the method 900 is configured to set the presentation, response, and interaction for the tailored pointer. The soft presentation information for the "fake" tailored pointer includes layout, color, size, format, opacity, shape, iconography, position and other presentation aspects. The soft response information includes how the tailored pointer reacts to user input, user input rates, trackball rotations, as well as pointer sensitivity, momentum, stickiness, pointer lock, and keyboard inputs. The soft interaction information includes how the tailored pointer interacts with other elements of the page, such as input boxes, links, buttons, page boundaries, and images. The soft information for the tailored pointer can be varied in ways that are not predictable to a malware user, but do not adversely impact the hard information and operation of the page. A malware user would not know what presentation, response and interaction for the OS pointer to expect, making it difficult for a malware user to spoof the application and enter valid information or select a valid entry with the correct coordinates.

In block 930, method 900 identifies page or application elements to display on a page. Page elements correspond to screen widgets, such as textual information, images, input boxes, links, and buttons. Page elements can be added or deleted from the page in ways that are not predictable to a malware user, but do not adversely impact hard information and the operation of the page. The page elements may be modified by changing, adding, or removing application code for those elements. Therefore, the identified page elements may differ from the set of page elements from a known web application page, such as a bank's login page that has been in public use. The "body element" of the page lists and characterizes the elements that are included on the page, and reflects additions and deletions that occur in block 535. The malware user would not know what page elements are added or deleted from the page as expected, making it difficult for a malware user to spoof the application and enter valid information or select a valid entry with the correct coordinates.

In block 940, method 900 sets the presentation, response and interaction for the page elements, retaining hard functionality and enabling malware detection. Just as the OS pointer and tailored pointer have soft presentation, response and interaction properties, each page element has soft presentation, response and interaction properties that can be altered. The page elements include the images, buttons, borders, inputs, forms, canvases, div elements, and animations. Method 900 ensures that the soft information variations applied in blocks 910, 920, 930 and 940 operate together so that the web page and application still function as expected. For example, a valid user is able to enter data and interact with the page as desired, data can be entered in a manner acceptable to the client operation system, TCP stack, and technologies upstream to the client device, such as security proxies and an application server. This ensures that hard information and proper page functionality is preserved. Before and/or during the time that hard information is being gathered together, and sent to the application server, malware can be detected and a security device notified of malware activity. For example the location of a CLICK as the malware attempts to SUBMIT an authentication form may be engineered by suitable choices of presentation, response and interaction properties of the OS pointer, tailored pointer, and page elements, such that the CLICK location is different for human users than it is for malware "users".

In block 950, the method 900 displays the page elements, OS pointer, and tailored pointer, according to the soft presentation, soft response, and soft interaction elements that are set in blocks 920, 930, and 940. Displaying includes presenting the page elements, and incorporating software corresponding to the soft response and soft interaction aspects of the OS pointer, tailored pointer and the page elements.

In block 960, method 900 receives pointer click coordinates. The pointer click coordinates may be from a valid local user, an authorized remote user, an invalid remote user, or malware user. Valid local users will click on a user interface, such as a mouse, trackball, touchpad, touchscreen, keypad, keyboard, or voice entry. Valid users will click based on the tailored pointer soft presentation, response, and interaction information. In contrast, malware unaware of the tailored pointer soft presentation, response, and interaction information would feed pointer positions to the OS pointer queue that does not take into account the soft tailored pointer information, making it possible to distinguish between valid users and malware users, in block 970.

In block 970, the method 900 determines whether the pointer click coordinates correspond to a valid user or malware. If they are, in block 980 method 900 labels the click as valid. If not, in block 990 method 900 labels the click as potential malware. Method 900 may return to step 960 one, several, or up to a threshold number of times before concluding a malware user is trying to gain access. Method 900 may label a click as potential malware if do not correspond to the expected location of a page element, but they do correspond to the original location of the page element before modification from application of the soft presentation, response and interaction properties.

In example embodiments, in block 910, method 900 may alter the OS pointer presentation to be just 1×1 pixel large, so that is barely visible. Method 900 may also alters the OS pointer response to user input by implementing pointer lock on the page. In block 920, method 900 may add a new look-a-like (tailored) pointer image to the page as an SVG element positioned to trail the motion of the OS pointer by, for example, 100 pixels to its left. The new look-a-like pointer may be programmed to disappear when the user moves the pointer over a pixel region or zone, such as a region a region containing an image, or a region near a page element border. Method 900 sets the interaction for the page elements, so that whenever the user engages the keyboard, method 900 adds a new SUBMIT button and a new div element to the body page element.

In these example embodiments, the first constraint of block 940 is that the page still functions and hard information is preserved. This can be accomplished by positioning the new submit button at the position of the original submit button. The second constraint of block 940, that malware can be detected, can be accomplished by the following steps. First, method 900 positions the original SUBMIT button 100 pixels to the right of its original location. Second, method 900 styles the original SUBMIT button to the same color as the background of the page at that shifted location, so that it is not visible to the user. Third, method 900 attaches a click listener to the new div. Fourth, method 900 makes the new div transparent, with a new div element the size of the original submit button. Fifth, method 900 places the new div element 100 pixels to the left of the original submit button. Sixth, method 900 attaches a click listener to the div element. Seventh, method 900 programs the click listener programmed to send an XHR request to a security device, so that when the malware moves the OS pointer to the position of the original submit button, the look-a-like pointer clicks on the new div element and the attached click listener transmits a warning packet to alert the security device. If the real user moves the fake pointer to the new SUBMIT button, the original non-visible OS pointer clicks on the displaced SUBMIT button and the form is submitted as before. In alternative embodiments, instead of moving the SUBMIT button, the method 900 may move a location of a submit function 100 pixels to the right of its original location. In other words, the method 900 moves a target area for the submit function from the SUBMIT button to instead another area of a webpage or application.

In other example embodiments, a malware script is configured to login/authenticate to a web service. The malware script injects stolen username password credentials into the login form, and attempts to "click" on the SUBMIT button associated with the login form for the web service. The malware may take note of the (x,y) coordinate position of the login button, and the (x,y) coordinate position of the pointer. The malware wishes to place the pointer over the SUBMIT button's location, and may direct a trackball to be rotated, or a pointer translated (or submit input device outputs to simulate pointer movement), so that the "click" action the malware performs takes place over the SUBMIT button. Although the malware can readily measure button location and OS pointer location coordinates, the malware does not know the pointer's soft response to user input settings, such as trackball sensitivity settings, pointer lock settings, pointer momentum settings, pointer stickiness settings, or other soft features. As a result, the malware will not be able to provide the correct instructions to move the pointer to the SUBMIT button position on the page. The mouse (pointer) click action will be in the wrong location, making it possible to determine that the resultant pointer click in not valid.

Figure 10:
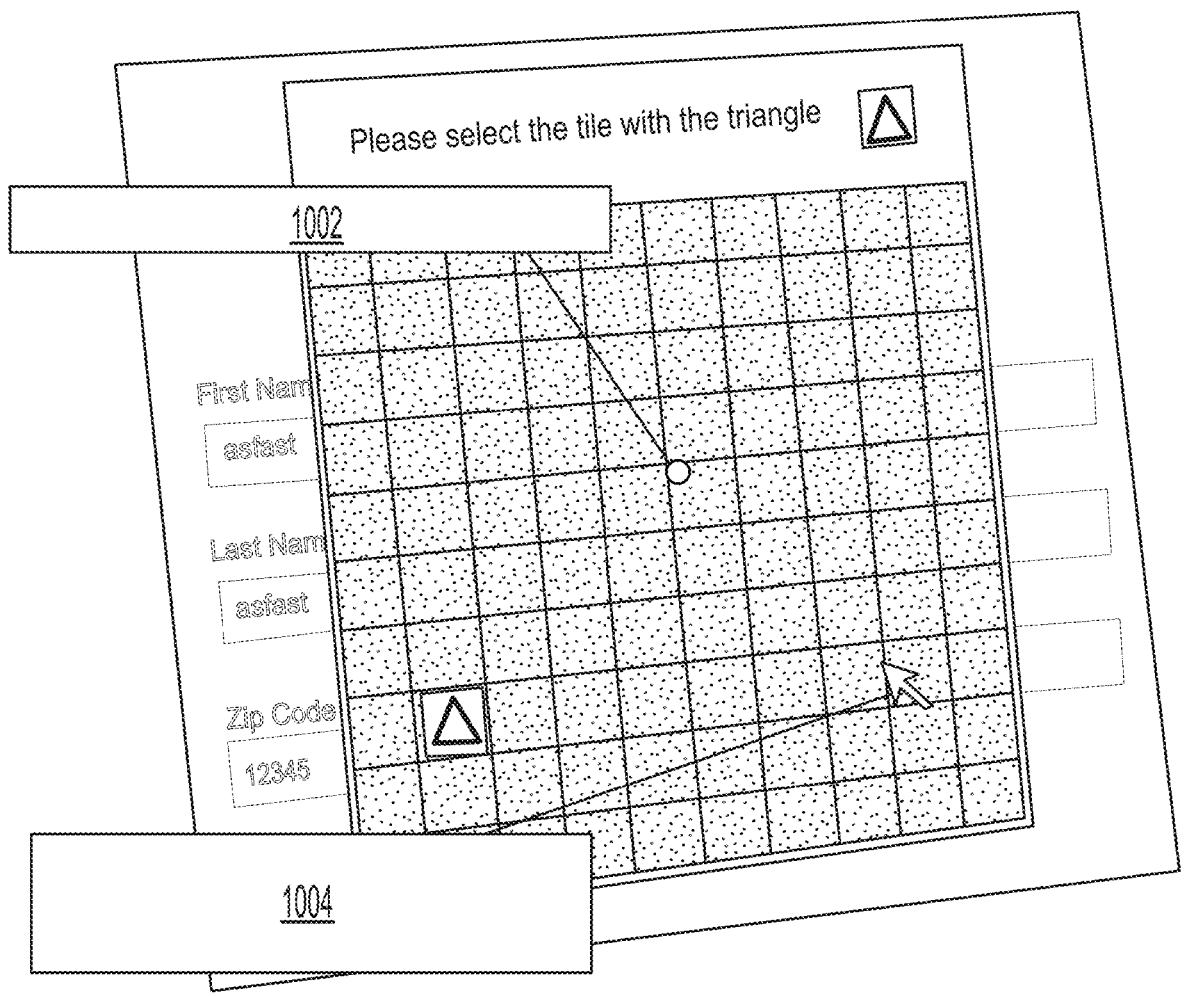
FIG. 10 illustrates another implementation of an application of a tailored pointer, in which one or more pointer locks are used, according to an example embodiment of the present disclosure.

FIG. 10 shows another implementation of an application of a tailored pointer, in which one or more pointer locks are used. A pointer lock is a built-in browser feature included in HTML5 compatible and other browsers. The purpose of pointer lock is to enable web browsers as a platform for gaming, to keep the pointer from escaping the field of play of the game, especially in first person shooter games. The feature locks the pointer to the center 1002 of the browser window. Pointer move events are interpreted as commands for the shooters' perspective to rotate (look to the left or to the right in the 3D scenario, or to look up or down). Pointer lock is one of many browser features that can be specified by a web page developer, just as the OS pointer can be set (or styled) to be invisible at the discretion of the web developer. Such tunable page features alter the soft information on the page. Changes in soft features should be consistent with the hard information requirements of the page's intent and design. For example, it should be possible for the form to be filled out by a user, and submitted by the client hosting the page to a server.

The "border of the browser window boundary" transition problem never occurs because pointer lock prevents the pointer 1004 from going to the border. To return to normal pointer control the user may hit the ESC key or the game may also release the pointer by clicking the triangle as shown in the image. The browser runs in the operation system, and can have the capability to draw in the browser window. The browser "listens" to the OS pointer event queue and receives pointer coordinate information from the operating system. This information can be used to identify what browser element is "under" the pointer. For example, the browser may change the color of an element if it is being hovered over. When pointer lock is enabled, the browser exits the mode in which it only receives pointer information, and enters a mode of operation in which it also transmits pointer move requests. For example, the browser can insert a pointer move request into the OS queue to position the pointer at specific coordinates (such as (100,100)) of the browser window.

With pointer lock enabled, the browser both transmits and receives pointer movements from and to the OS. This information flow is a tunable application parameter of the soft information type as it does not directly impact the TCP stack data such as session ID's, cookies, HTTP POST or GET data fields, etc., and/or directly prohibit the user from effectively generating and transmitting data required for the application to function as intended to upstream internet devices. As with any soft information changes implemented by the present disclosure it is subject to the workflow outlined in method 900 to ensure that soft changes made to the application are counterbalanced and all mesh together to preserve required hard functionality. The goal of pointer lock is to keep the pointer position at a fixed position, such as the center, of the browser window. This prevents, for example, the pointer from exiting the browser window, for applications including video gaming. This also prevents users from inadvertently exiting a browser window when abruptly "yanking" the pointer in response to a surprise gaming event. The browser receives pointer coordinates from the operating system, and can display a tailored pointer in response to changes in pointer coordinates. While browsers typically only receive pointer coordinate information from the OS, with pointer lock a browser can transmit movement requests to the OS.

In some embodiments, a browser add-on or application software wrapper moves the OS pointer position to a position that is randomized and/or a function of time, OS pointer position, and/or dependent on user actions. This differs from traditional pointer lock implementations in which the OS pointer is positioned to a particular spot such as at the center of a window and not controllable or tunable by the web page or application page designer. Such enhanced pointer lock embodiments can be applied to specialized industrial environments, such as internal corporate networks, power plants and/or other industrial control applications.

Figure 11:
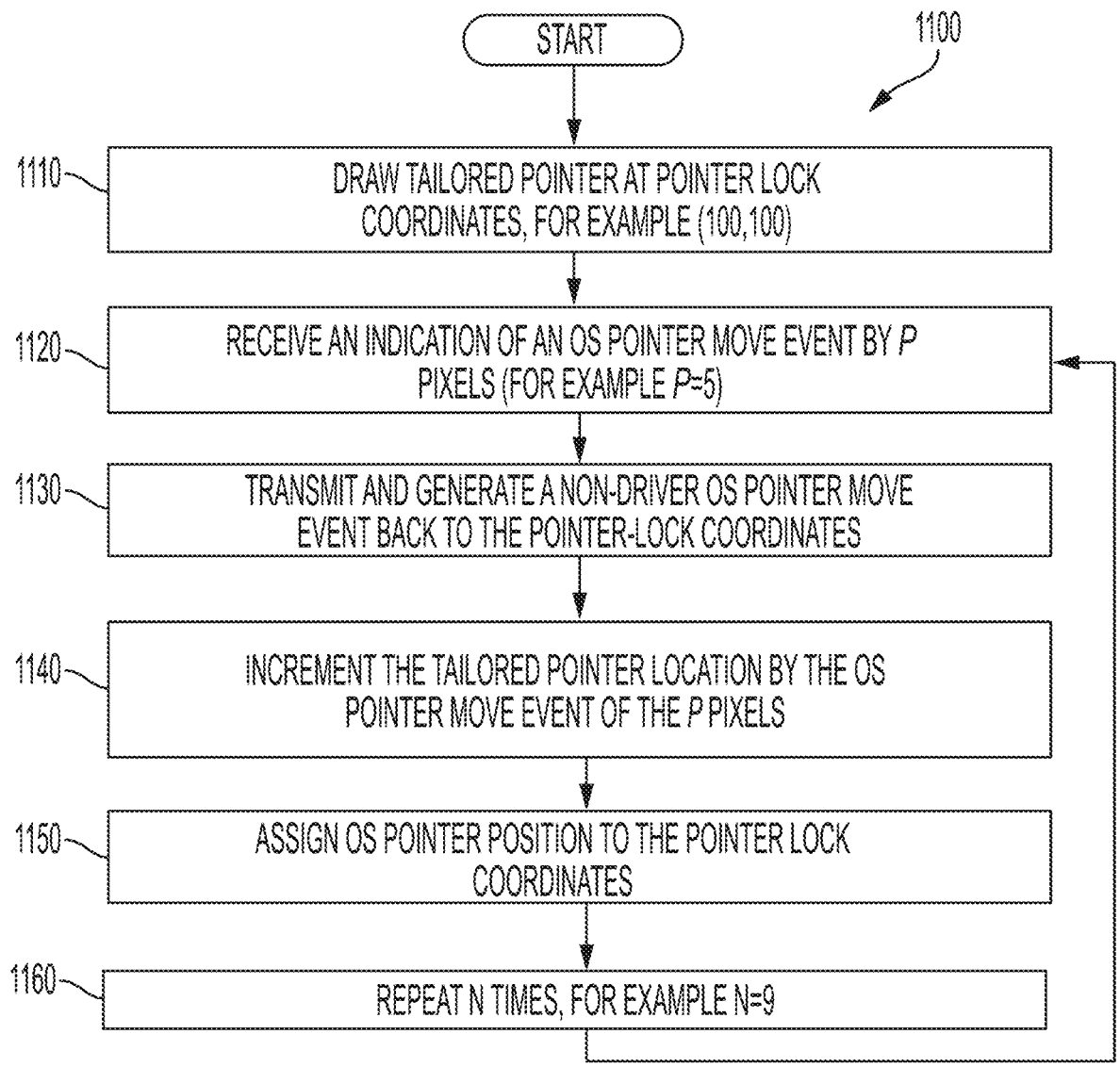
FIG. 11 illustrates a flowchart of an implementation of an application of a tailored pointer, in which one or more pointer locks are used, according to an example embodiment of the present disclosure.

FIG. 11 is a flowchart of a method 1100 of an application of a tailored pointer, in which one or more pointer locks are used. Method 1100 can be applied to legitimate local users and malware users. Operations for each are considered in turn. The coordinate values, number of pixels moved, number of iterations, and other values herein are included for illustration purposes. These parameters would vary with different embodiments.

At the beginning of a web session for a legitimate local user, the OS pointer position may be known by the OS to be at screen position (100,100), which corresponds to the pointer lock coordinates at the center of the screen. In box 1110, method 1100 draws a tailored pointer at the pointer lock coordinates. This is the "current" tailored pointer position.

In box 1120, method 1100 receives an indication of an OS pointer move event by, for example P pixels, where P=5. As the legitimate local user moves the mouse, the local pointer driver causes the local OS to place the pointer at, for example (105, 100) due to the movement by five pixels.

In box 1130, method 1100 transmits and generates a non-driver OS pointer move event back to the pointer lock coordinates, in response to the news that the OS pointer has been shifted to (105,100).

In box 1140, method 1100 increments the tailored pointer location by five pixels corresponding to the received OS move event. To accomplish this, the browser reports a +(5,0) move to the renderer or drawing capability of the tailored pointer. In this example, the location of the tailored pointer location increases by 5 pixels with each iteration.

In box 1150, method 110 assigns the OS pointer position to the pointer lock coordinates of, for example, (100, 100).

In block 1160, method 1100 repeats steps 1120-1150 N times. For example, 9 times for a total of 10 iterations. For this example, the tailored pointer location incrementally and smoothly moves, 5 pixels at a time, from (100,100) to (150,100), with each iteration.

The method 1100 can also be applied for a remote malware user. The remote driver, such as a remote malware user. It is unlikely that the pointer of the remote driver starts at the pointer lock coordinates of (100,100). For example, the OS pointer at the remote driver's device may start at screen coordinates (300, 100). After the remove hacker establishes a connection to control the targeted machine, the remote hacker begins to drive or control the pointer of the targeted machine by sending its own coordinates as pointer movement commands. In box 1110, method 1100 draws a tailored pointer at pointer lock coordinates (100, 100). The remote hacker may then issue a command to move from its starting point of (300, 100) to (295, 100).

In box 1120, method 1100 receives a command to move the pointer to (295, 100). In box 1130, method 1100 generates a non-driver OS pointer move event back to the pointer lock coordinates of (100, 100).

In box 1140, method 1100 increments the tailored pointer location by (295, 100)–(100, 100)=(195, 0). This causes the tailored pointer location to "jump" by 195 pixels. Subsequent iterations will lead to jumps of 190, 185, etc. pixels.

In box 1150, method 1100 assigns the OS pointer position to the pointer lock coordinates, while the visible tailored pointer locations are "jumping" to multiple screen locations, making it difficult for the malware user to click on the OS pointer.

In some embodiments, the method 1100, under control of the local browser, may selectively accept or ignore pointer events fed to it from its OS.

In some embodiments, the method 1100 may, at random intervals and/or as a function of OS pointer position, and/or dependent on user actions, change the OS pointer position. Such changes would be known to the local browser or application, but not known to a remote user.

Figure 12:
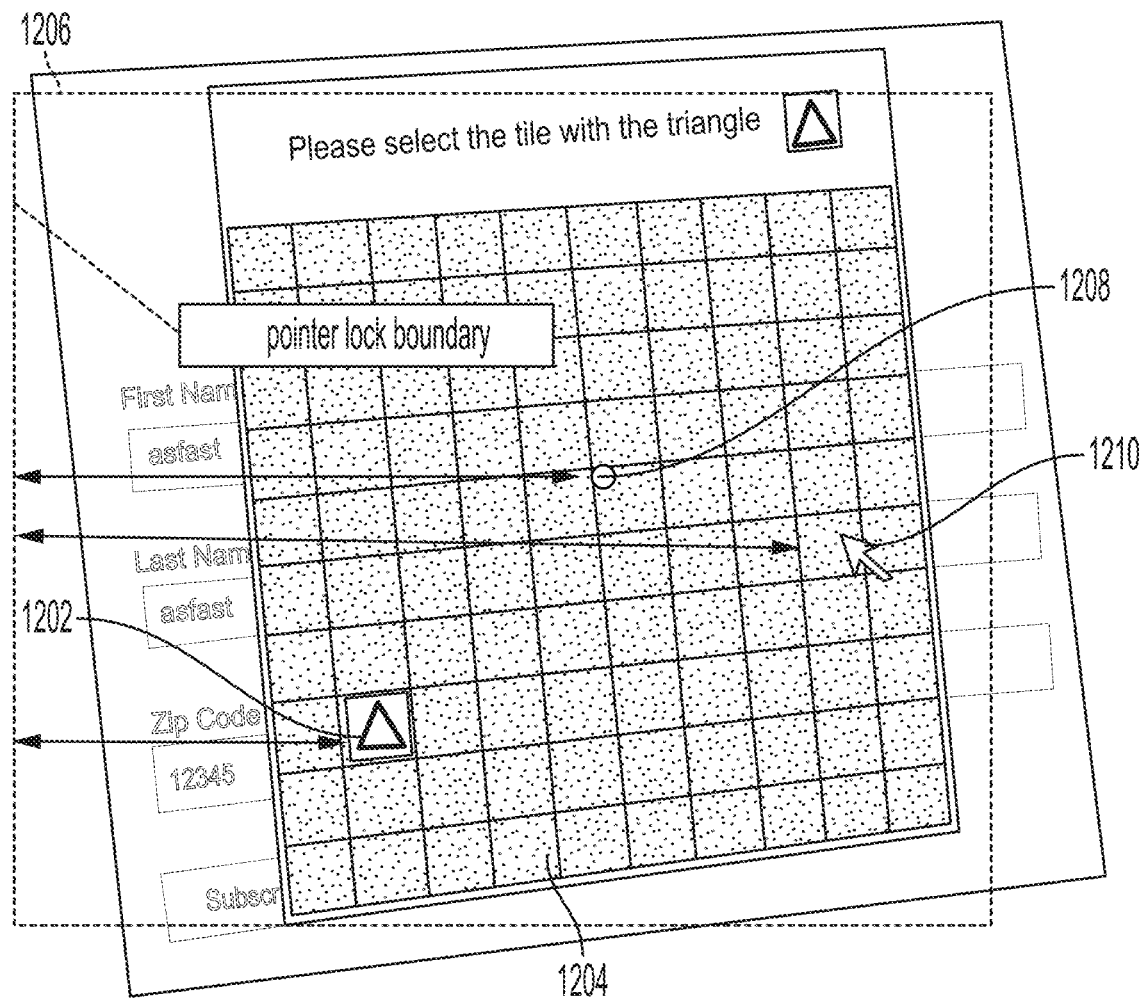
FIG. 12 illustrates another implementation of an application of a tailored pointer, in which one or more pointer locks are used for pointer positioning, according to an example embodiment of the present disclosure.

FIG. 12 shows another implementation of an application of a tailored pointer, in which one or more pointer locks 1208 are used for pointer 1210 positioning. Let the triangle image 1202 be placed on one of the 10×10 tiles in the grid 1204 shown. If the "fake" pointer image is placed on the "other side" (to the right in this image) of the hot spot from the triangle the user must "move" the pointer-locked" hot spot into the pointer lock boundary 1206 area to hit the triangle target 1202.

Figure 13:
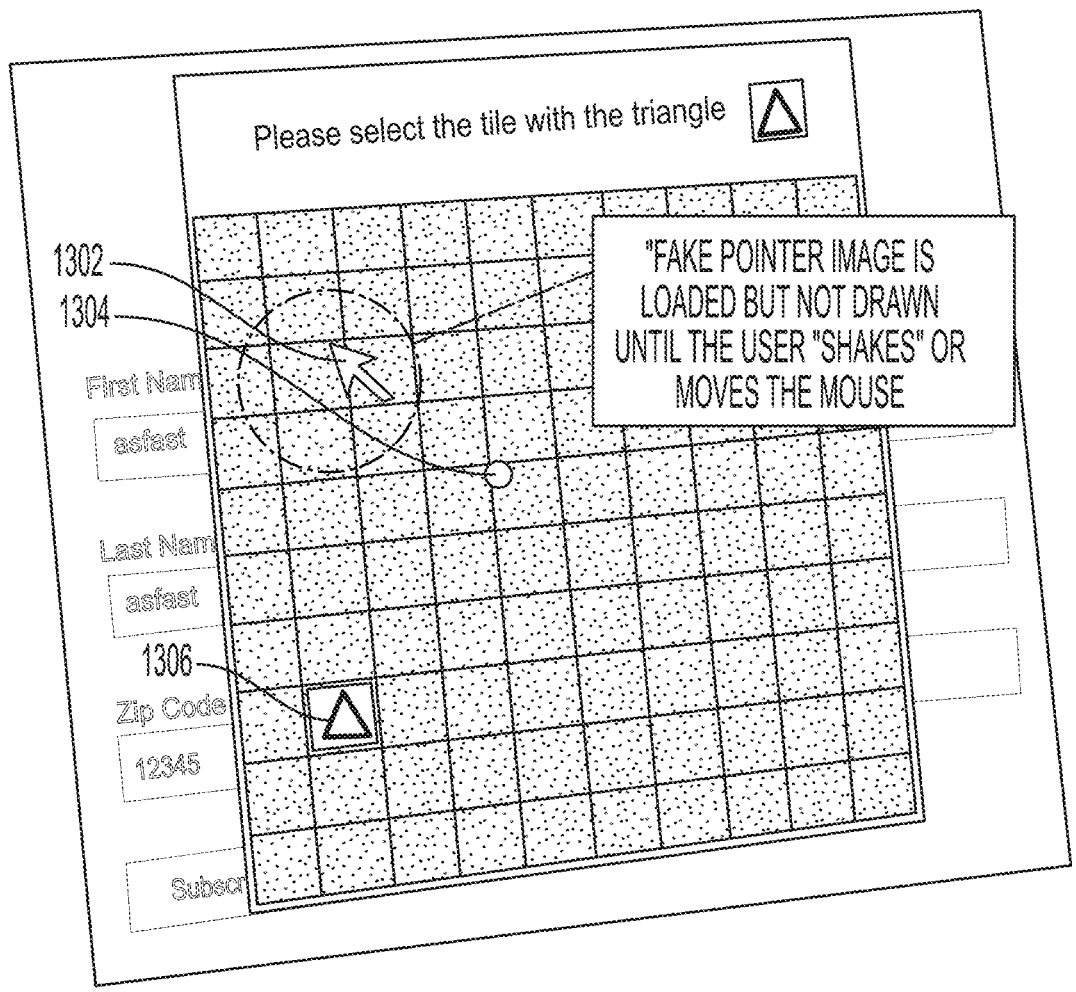
FIG. 13 illustrates another implementation of an application of a tailored pointer, in which a pointer is not drawn until the pointer is in motion, according to an example embodiment of the present disclosure.

FIG. 13 shows another implementation of an application of a tailored pointer 1302, in which a pointer is not drawn until the pointer is in motion.

Figure 14:
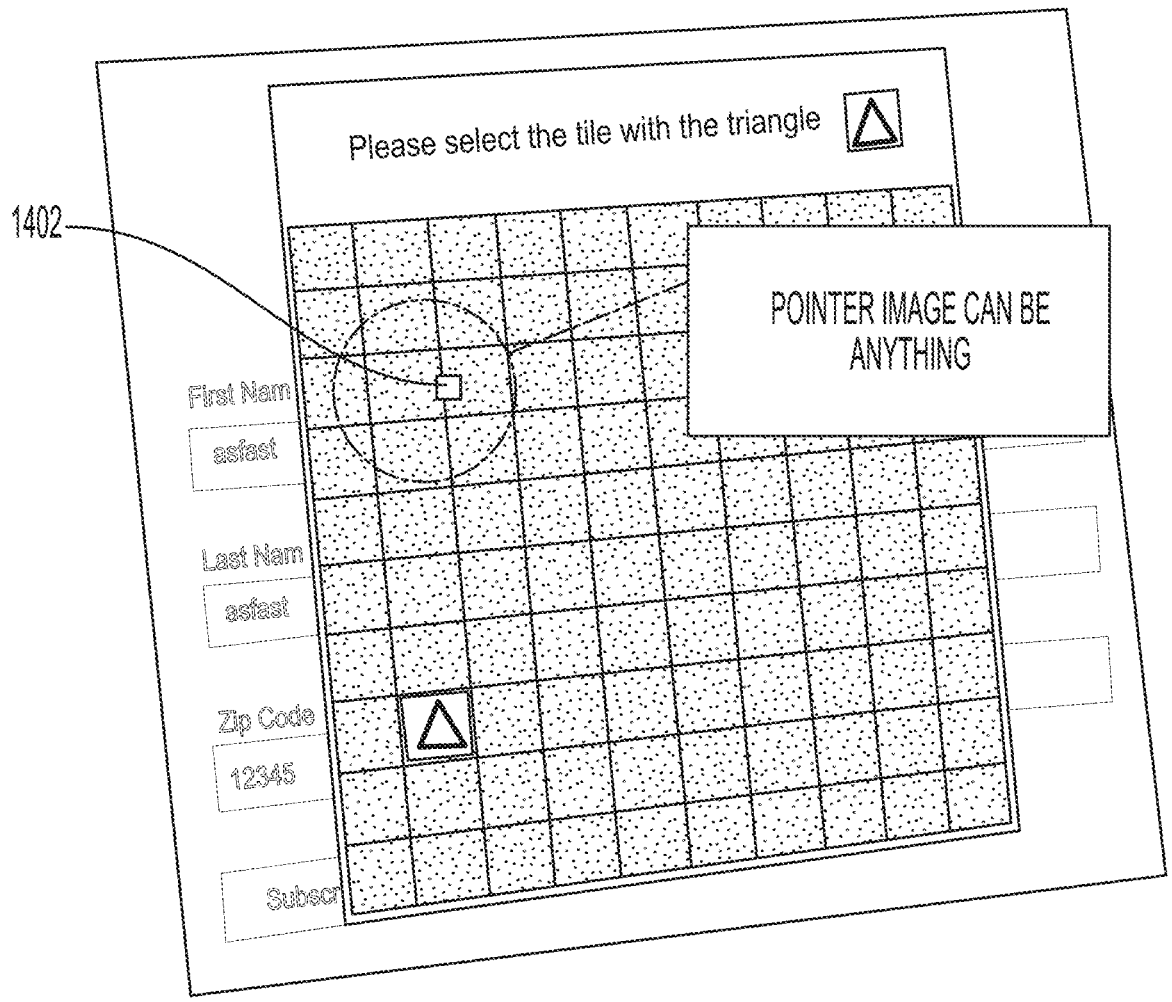
FIG. 14 illustrates another implementation of an application of a tailored pointer, in which the tailored pointer appears as something other than a classical "arrow" icon, according to an example embodiment of the present disclosure.

FIG. 14 shows another implementation of an application of a tailored pointer, in which the tailored pointer 1402 appears as something other than a classical "arrow" icon. In current practice any webpage is free to define a custom pointer image as a canvas, svg image, jpeg or any other format as specified to create an enjoyable or fun user experience—for example a web game might define the pointer to look like the cross hairs of a rifle scope. In another scenario the pointer might appear as a running/jumping cartoon-like human figure, etc.—the malware can readily locate the triangle but it has no provided context with which to locate the abstract pointer. As an example: classical captcha provides the "street signs" as a stated context and challenges the AI/algorithm to utilize that stated context to solve the challenge. In another example, the tailored pointer may appear as an icon, emoji, or cartoon character.

Figure 15:
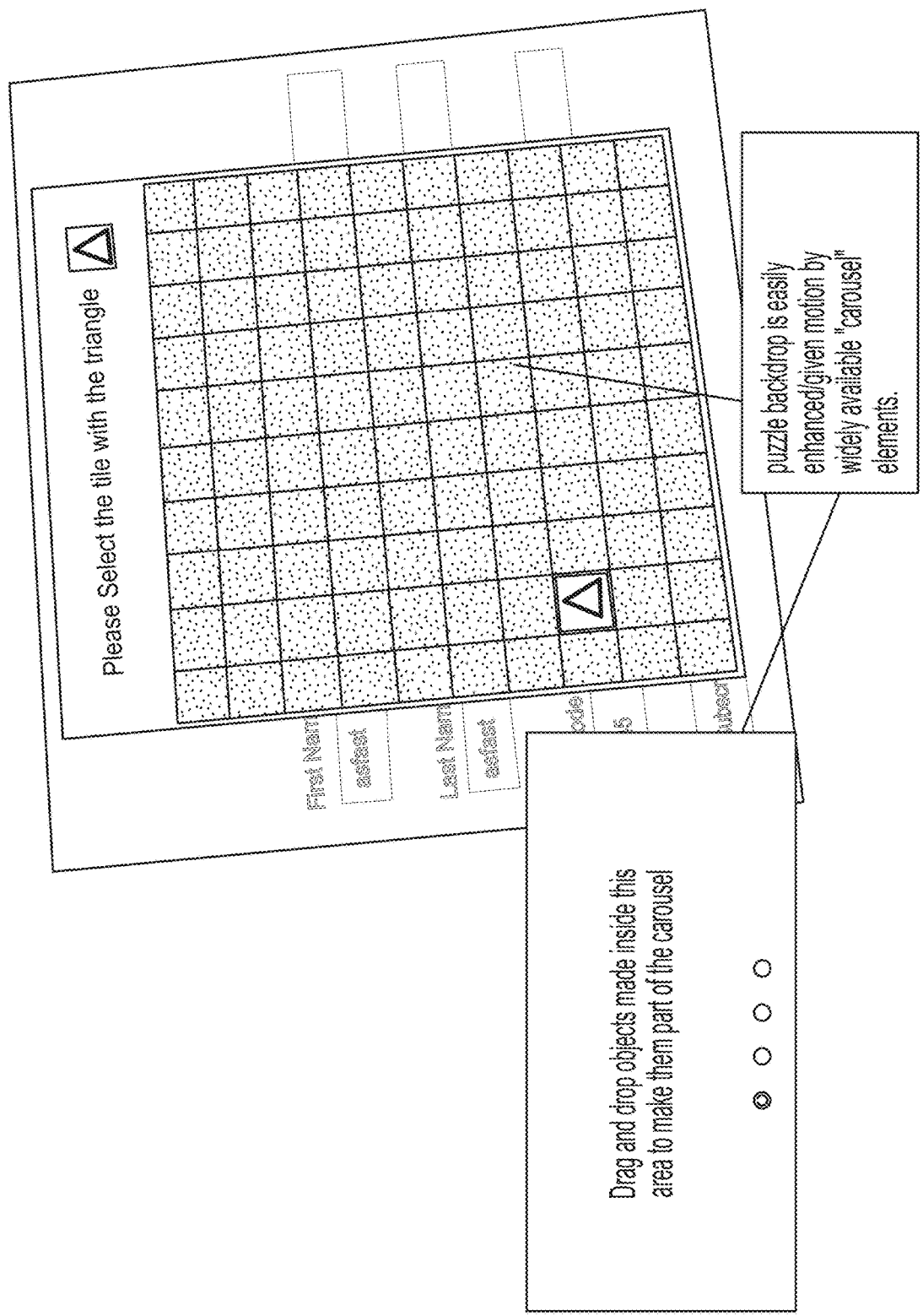
FIG. 15 illustrates another implementation of an application of a tailored pointer, in which the pointer is defined as the "thing" in motion, according to an example embodiment of the present disclosure.

FIG. 15 illustrates another implementation of an application of a tailored pointer, in which the pointer is defined as the "thing" in motion.

Figure 16:
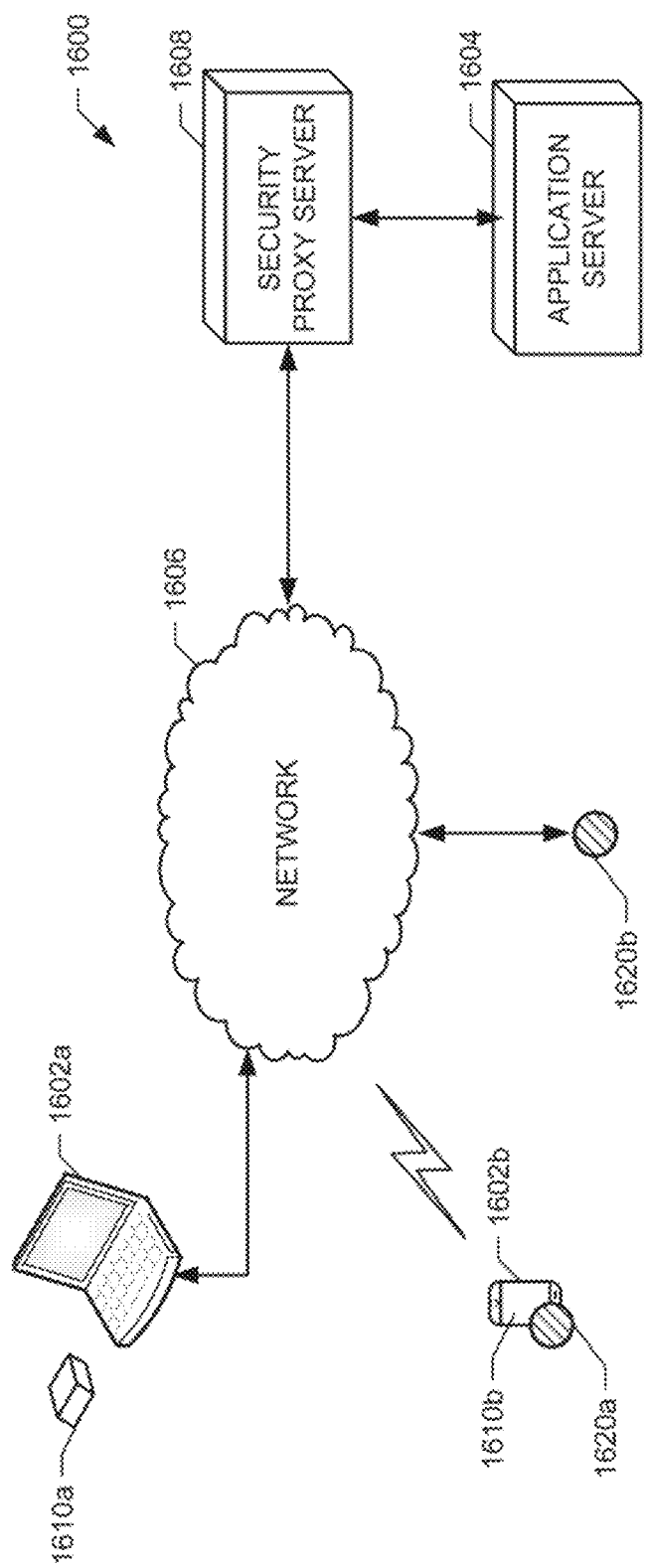
FIGS. 16 and 17 illustrate diagrams of an input device security environment, according to example embodiments of the present disclosure.

FIG. 16 illustrates a diagram of an example input device security environment 1600, according to an example embodiment of the present disclosure. In the illustrated example, client devices 1602 are communicatively coupled to an application server 1604 via a network 1606 and a proxy server 1608. The client devices 1602a and 1602b may include any smartphone, tablet computer, laptop computer, workstation, desktop computer, etc. The client devices 1602a and 1602b may include one or more input devices such as a mouse 1610a and/or a touchscreen 1610b.

The example application server 1604 is configured to provide or host any application, website, multimedia content, social media information, etc. The network 1606 may include any network such as the Internet or a local area network. In some embodiments, the application server 1604 may communicate with an application operating on the client device 1602. For example, the application server 1604 may host a website that is displayed within a web browser on the client device 1602. In other embodiments, the application server 1604 includes one or more application programming interfaces ("APIs") connected to processors and the client devices 1602 include an application (e.g., an App) that is configured to communicate with the APIs.

The example security proxy server 1608 is configured to receive data transmitted from the application server 1604 to the client devices 1602. The data may include, for example, application code, such as website code or data transmitted to an application. As disclosed herein, the security proxy server 1608 is configured to modify, add, and/or remove soft information by changing the application code. For instance, the security proxy server 1608 may change a location of one or more application elements by hiding some application elements from display and creating graphics that visually imitate the elements for display at a location that is an offset vector away from the hidden elements. In other examples, the security proxy server 1608 is configured to change a selectable area or page coordinates related one or more functions that are associated with application elements.

Figure 17:
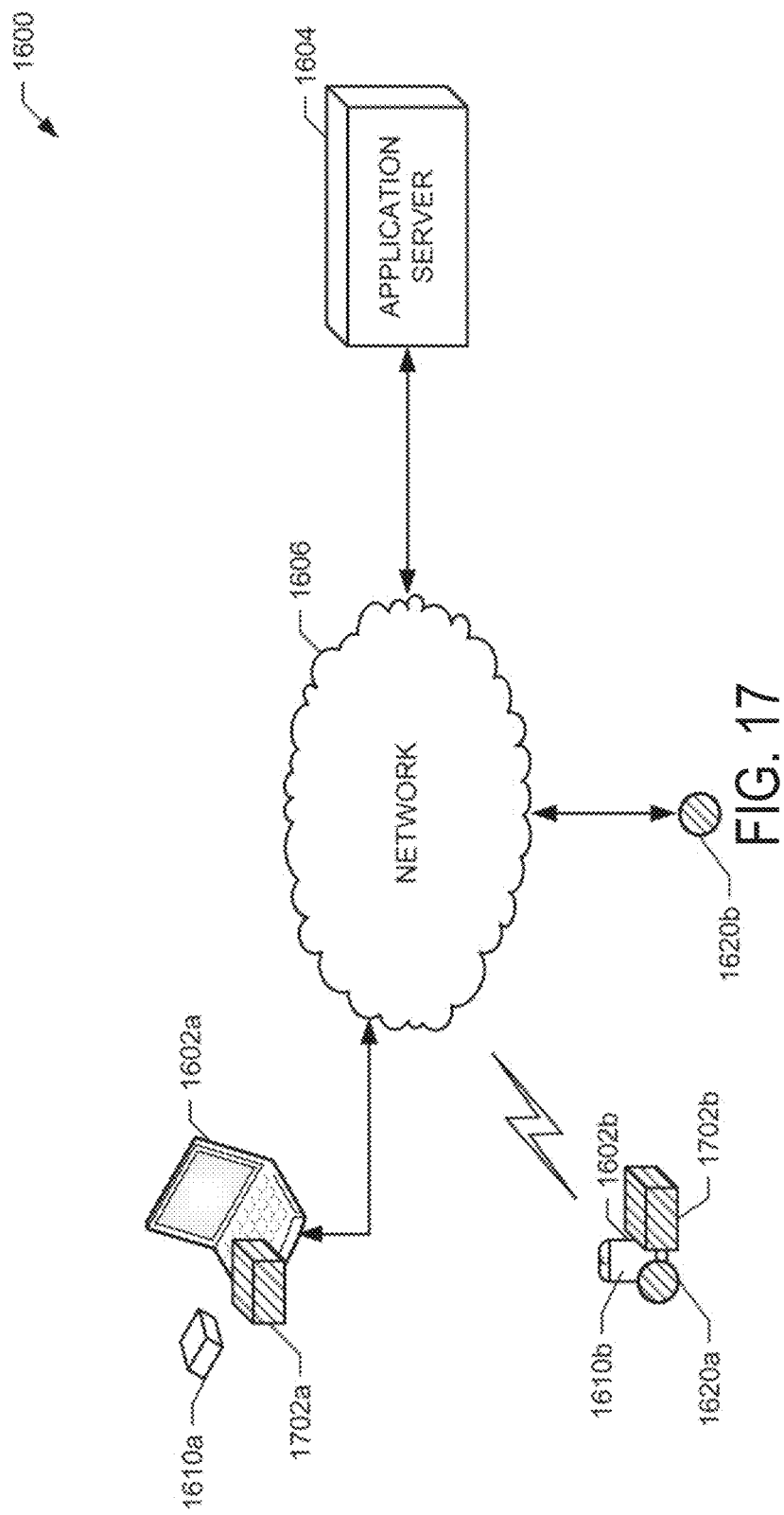

The security proxy server 1608 may be configured to modify any type of application code including, for example, TypeScript, eXtensible Markup Language ("XML"), HyperText Markup Language ("HTML"), JavaScript, Cascading Style Sheet ("CSS"), and/or other script-based language that is compatible with a web browser or other user interface-centric application. In some embodiments, the proxy server 1608 may cause a security application to be installed on the client device 1602, as shown in FIG. 17. The security application may include, for example, a browser plug-in, applet, or other program configured to perform the operations described herein.

The example security proxy server 1608 may also change a location of a pointer. In some embodiments, the security proxy server 1608 creates or modifies a pointer file associated with the application code (or modifies a definition of a pointer in the application code) such that a pointer is displayed an offset vector away from a location of a pointer specified by an operating system of the client device. The server 1608 may also modify or cause the operating system pointer to be hidden from view. Additionally or alternatively, the security proxy server 1608 may modify an operating system pointer file to change a location at which a pointer is displayed within a pixel area, as discussed in connection with FIGS. 1B and 3 above.

For touchscreen devices, the security proxy server 1608 may change an input file associated with the touchscreen such that user-provided inputs are shifted by a determined offset. In other examples, the security proxy server 1608 may apply a hidden or viewable pointer that is specified to be located an offset away from where a user engages a touchscreen. The security proxy server 1608 may apply a hot spot for the pointer such that selection by a user in one location on the application viewer causes the pointer to provide a hot spot selection at another part of the application viewer.

FIG. 16 also illustrates malware or malicious applications 1620. The malware 1620 may be embedded on the client device 1602b and/or connected to the network 1606. The malware 1620 may locally attempt to provide inputs to access data from the application server 1604. The malware 1620 may analyze network traffic to provide inputs to access data from the application server 1604. In some instances, the malware 1620b may send instructions to the malware 1620a on the client device 1602b providing automated or manual control to access data from the application server 1604.

As disclosed throughout, the example security proxy server 1608 is configured to apply offsets to displayed application elements and pointer elements to prevent the malware 1620 from being able to interact with an application or webpage. The malware 1620 attempts to use pointer coordinates, as determined by an operating system of the client device 1602 to move to a designated application element, such as a "Submit" button. However, the "Submit" button is separate from a submit function, which is located a specified offset away, potentially with a hidden "Submit" button or other application element. As a result of the offset, the malicious application 1620 is unable to direct the pointer to the function that provides functionality for the "Submit" button, and is prevented from maliciously accessing the application server 1604.

The security proxy server 1608 may also be configured to process responses from the client devices 1602. The security proxy server 1608 may analyze a response to determine if a pointer selection corresponds to a location of a function (e.g., a hidden application element), a security element, or the displayed application element. Selection of the function is indicative that the user is legitimate, which causes the security proxy server 1608 to validate the selection and pass the response information to the application server 1604. Selection of a security element or the displayed application element is indicative of malware and causes the security proxy server 1608 to block or prevent the response from being transmitted to the application server 1604. In some embodiments, the security proxy server 1608 may generate and transmit an alarm and/or an alert to the application server 1604 that is indicative of the malware. In response, the application server 1604 may block the client device 1602 and/or transmit a message notifying a user of the malware.

FIG. 17 shows an alternative embodiment where the application server 1604 is connected directly to the network 1606 and the proxy server 1608 is replaced with a security application 1702 that is installed on the client device 1602. The application 1702 may include a plug-in to a web browser, a stand-alone application, a proxy for the client device, etc. In the illustrated example, the security application 1702 is configured to modify application code after it is received in the client device 1602 from the application server 1604. The application 1702 may modify the code prior to display on an application or within a web browser. As discussed above, the application 1702 may modify soft information related to application elements. The application 1702 may also modify a visual appearance of an operating system pointer specified for an application as disclosed herein.

Similar to the security proxy server 1608 of FIG. 16, the security application also be configured to process responses from the client devices 1602. Before transmission across the network 1606, the security application 1702 may analyze a response to determine if a pointer selection corresponds to a location of a function (e.g., a hidden application element), a security element, or the displayed application element. Selection of the function is indicative that the user is legitimate, which causes the security application 1702 to validate the selection and transmit the response information to the application server 1604. Selection of a security element or the displayed application element is indicative of malware and causes the security application 1702 to block or prevent the response from being transmitted to the application server 1604. In some embodiments, the security application 1702 may generate and transmit an alarm and/or an alert to the application server 1604 that is indicative of the malware. In response, the application server 1604 (or the security application 1702) may block the client device 1602 and/or transmit a message notifying a user of the malware.

For some embodiments of the disclosed technology, including those depicted in the figures, the soft presentation information of the pointer may be dependent on time since start of session, user interactions, (x,y) position while preserving the look and feel of the original page, preserving functionality of the original page, and therefore preserving the hard information of the session/application. For some embodiments of the disclosed technology, including those depicted in the figures, the soft response information of the pointer may also be dependent on time since start of session, user interactions, and (x,y) position, while preserving the look and feel and functionality of the original page. For some embodiments of the disclosed technology, including those depicted in the figures, soft information changes of the page/application environment in which the pointer acts may also be enabled subject to the constraints that the hard information required for the client and server to transmit and receive data in order to fulfill the intended use case of the application are preserved.

One or more aspects or features of the subject matter described herein can be realized in digital electronic circuitry, integrated circuitry, specially designed application specific integrated circuits ("ASICs"), field programmable gate arrays ("FPGAs") computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include client devices and servers. A client device and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

To provide for interaction with a user, one or more aspects or features of the subject matter described herein can be implemented on a computer having a display device, such as for example a cathode ray tube ("CRT") or a liquid crystal display ("LCD") or a light emitting diode ("LED") monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

Aspects of the Example Systems, Apparatuses, and Methods

Aspects of the subject matter described herein may be useful alone or in combination with one or more other aspect described herein. Without limiting the foregoing description, in a first aspect of the present disclosure, a machine-accessible device has instructions stored thereon that, when executed, cause a machine to at least receive application code for displaying an application within an application viewer, the application code including an element for display at a first element location, the element associated with a function that is executed after a pointer selection at the first element location, determine a first offset vector for the element and a second offset vector for a pointer, the second offset vector having a same magnitude but an opposite direction of the first offset vector, change the application code such that the function is executed after a pointer selection at a second element location that is the first offset vector away from the first element location, at least one of i) change a location of a pointer within a pixel area of a pointer file from a first pointer location to a second pointer location that is the second offset vector away from the first pointer location while leaving coordinates of a pointer hot spot unchanged, or ii) hide the pointer from view by modifying the pointer file and create a pointer image configured to track movement of the pointer that is the second offset vector away from the first pointer location, cause the changed application code to be displayed within the application viewer with the element located at the first element location and the function located at the second element location, cause the pointer or the pointer image to be displayed based on at least one of the changed pointer file or the pointer image, receive coordinates associated with a pointer selection at the pointer hot spot, and responsive to determining that the received coordinates correspond to the second element location, transmit an indication of the pointer selection being valid.

In accordance with a second aspect of the present disclosure, which may be used in combination with any other aspect listed herein unless stated otherwise, the machine-accessible device has instructions stored thereon that, when executed, cause the machine to at least responsive to determining that the received coordinates correspond to the first element location, transmit an indication of the pointer selection being invalid.

In accordance with a third aspect of the present disclosure, which may be used in combination with any other aspect listed herein unless stated otherwise, the application code is received from a server via a network.

In accordance with a fourth aspect of the present disclosure, which may be used in combination with any other aspect listed herein unless stated otherwise, the machine-accessible device has instructions stored thereon that, when executed, cause the machine to at least transmit the indication of the pointer selection being valid to the server causing the server to process the selection of the function.

In accordance with a fifth aspect of the present disclosure, which may be used in combination with any other aspect listed herein unless stated otherwise, the function includes a submit function and the element includes at least one of a 'submit button', an ok 'ok button', a 'cancel button', or a widget.

In accordance with a sixth aspect of the present disclosure, which may be used in combination with any other aspect listed herein unless stated otherwise, the machine-accessible device has instructions stored thereon that, when executed, cause the machine to at least change the location of the pointer after the pointer is moved over the application viewed in a display area of a client device.

In accordance with a seventh aspect of the present disclosure, which may be used in combination with any other aspect listed herein unless stated otherwise, the change to the application code does not change the display of the element at the first location.

In accordance with an eighth aspect of the present disclosure, which may be used in combination with any other aspect listed herein unless stated otherwise, the application code includes website code and the application viewer includes a website browser.

In accordance with a ninth aspect of the present disclosure, which may be used in combination with any other aspect listed herein unless stated otherwise, the machine-accessible device has instructions stored thereon that, when executed, cause the machine to determine a location of the pointer within the application viewer, and determine the first offset and the second offset based on a function of the determined location of the pointer.

In accordance with a tenth aspect of the present disclosure, which may be used in combination with any other aspect listed herein unless stated otherwise, the function of the determined location includes at least one of a linear function, a piecewise linear function, a curvilinear function, a sinusoidal function, or combination thereof.

In accordance with an eleventh aspect of the present disclosure, which may be used in combination with any other aspect listed herein unless stated otherwise, the machine-accessible device has instructions stored thereon that, when executed, cause the machine to determine the first offset and the second offset as a function of time.

In accordance with a twelfth aspect of the present disclosure, which may be used in combination with any other aspect listed herein unless stated otherwise, a security server apparatus includes an interface configured to receive application code for displaying an application within an application viewer of a client device, the application code including an element for display at a first element location, the element associated with a function that is executed after a pointer selection at the first element location, and receive from the client device, coordinates associated with a pointer selection at a pointer hot spot within the application viewer; and a processor communicatively coupled to the interface and configured to determine a first offset vector for the element and a second offset vector for a pointer located at the use device, the second offset vector having a same magnitude but an opposite direction of the first offset vector, change the application code such that the function is executed after a pointer selection at a second element location that is the first offset vector away from the first element location, change a location of a pointer within the application viewer from a first pointer location to a second pointer location that is the second offset vector away from the first pointer location while leaving coordinates of a pointer hot spot unchanged, and determine that the received coordinates correspond to the second element location, wherein the processor operates in connection with the interface to transmit the changed application code to the client device for displayed within the application viewer with the element located at the first element location and the function located at the second element location, transmit the change to the pointer file to the client device to cause the pointer to be displayed based on changed pointer file, and responsive to determining that the received coordinates correspond to the second element location, generate an indication of the pointer selection being valid.

In accordance with a thirteenth aspect of the present disclosure, which may be used in combination with any other aspect listed herein unless stated otherwise, the interface is communicatively coupled to an application server that hosts the application, and the application server receives the application code from the application server after the client device sends the application server a request for the application.

In accordance with a fourteenth aspect of the present disclosure, which may be used in combination with any other aspect listed herein unless stated otherwise, the processor operates in connection with the interface to transmit the indication of the pointer selection being valid to the server causing the server to process the selection of the function.

In accordance with a fifteenth aspect of the present disclosure, which may be used in combination with any other aspect listed herein unless stated otherwise, the example apparatus includes a proxy server configured as an intermediary device between the client device and the application server.

In accordance with a sixteenth aspect of the present disclosure, which may be used in combination with any other aspect listed herein unless stated otherwise, the processor is configured to change the location of the pointer within the application viewer by causing a pointer associated with an operating system of the client device to be hidden and creating or modifying a pointer file associated with the application to be the second offset vector away from the hidden pointer.

In accordance with a seventeenth aspect of the present disclosure, which may be used in combination with any other aspect listed herein unless stated otherwise, the processor is configured to change the location of the pointer within the application viewer by changing a location of a pointer graphic within a pixel area of a pointer file such that the pointer graphic is separated from a pointer hot spot by the second offset vector.

In accordance with an eighteenth aspect of the present disclosure, which may be used in combination with any other aspect listed herein unless stated otherwise, the processor is configured to determine at least one of the first offset vector and the second offset vector as a function based on at least one of a the pointer's location within the application viewer or a time.

In accordance with a nineteenth aspect of the present disclosure, which may be used in combination with any other aspect listed herein unless stated otherwise, the function includes at least one of a linear function, a piecewise linear function, a curvilinear function, a sinusoidal function, or combination thereof.

In accordance with a twentieth aspect of the present disclosure, which may be used in combination with any other aspect listed herein unless stated otherwise, the processor is configured to confirm that the at least one of the first offset vector and the second offset vector does not render the application code inoperable.

In accordance with a twenty-first aspect of the present disclosure, any of the structure and functionality illustrated and described in connection with FIGS. 1 to 17 may be used in combination with any of the structure and functionality illustrated and described in connection with any of the other of FIGS. 1 to 17 and with any one or more of the preceding aspects.

CONCLUSION

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A machine-accessible device having instructions stored thereon that, when executed, cause a machine to at least:
   receive application code for displaying an application within an application viewer of a client device, the application code including an element for display at a first element location, the element associated with a function that is executed after a pointer selection at the first element location;
   determine a first offset vector for the element and a second offset vector for a pointer, the second offset vector having a same magnitude but an opposite direction of the first offset vector;
   change the application code such that the function is executed after a pointer selection at a second element location that is the first offset vector away from the first element location, the changed application code causing at least one of:
      i) a location of a pointer to change within a pixel area of a pointer file from a first pointer location to a second pointer location that is the second offset vector away from the first pointer location, or
      ii) the pointer to be hidden from view by modifying the pointer file and creating a pointer image for the application that is configured to track movement of the hidden pointer that is the second offset vector away from the first pointer location;
   cause the changed application code to be transmitted to the application viewer of the client device with the element located at the first element location and the function located at the second element location, causing the pointer or the pointer image to be displayed based on at least one of the changed pointer file or the pointer image;
   receive coordinates associated with a pointer selection at a pointer hot spot from the application viewer of the client device; and
   responsive to determining that the received coordinates correspond to the second element location, transmit an indication of the pointer selection being valid to cause the function to be executed.

2. The machine-accessible device of claim 1, having instructions stored thereon that, when executed, cause the machine to at least responsive to determining that the received coordinates correspond to the first element location, transmit an indication of the pointer selection being invalid or prevent the function from being executed.

3. The machine-accessible device of claim 1, wherein the application code is received from an application server via a network.

4. The machine-accessible device of claim 3, having instructions stored thereon that, when executed, cause the machine to transmit the indication of the pointer selection being valid to the application server causing the application server to process data related to the selection of the function.

5. The machine-accessible device of claim 1, wherein the function includes a submit function and the element includes at least one of a 'submit button', an 'ok button', a 'cancel button', or a widget.

6. The machine-accessible device of claim 1, wherein the changed application code is configured to change the location of the pointer after the pointer is moved over the application viewer in a display area of the client device.

7. The machine-accessible device of claim 1, wherein the change to the application code does not change the display of the element at the first element location.

8. The machine-accessible device of claim 1, wherein the application code includes website code and the application viewer includes a website browser.

9. The machine-accessible device of claim 1, having instructions stored thereon that, when executed, cause the machine to:
determine the location of the pointer within the application viewer; and
determine the first offset vector and the second offset vector based on an equation for the determined location of the pointer.

10. The machine-accessible device of claim 9, wherein the equation of the determined location includes at least one of a linear equation, a piecewise linear equation, a curvilinear equation, a sinusoidal equation, or a combination thereof.

11. The machine-accessible device of claim 1, having instructions stored thereon that, when executed, cause the machine to determine the first offset vector and the second offset vector as a function of time.

12. A security server apparatus comprising:
an interface configured to:
receive application code for displaying an application within an application viewer of a client device, the application code including an element for display at a first element location, the element associated with a function that is executed after a pointer selection at the first element location, and
receive from the client device, coordinates associated with a pointer selection at a pointer hot spot within the application viewer; and
a processor communicatively coupled to the interface and configured to:
determine a first offset vector for the element and a second offset vector for a pointer, the second offset vector having a same magnitude but an opposite direction of the first offset vector,
change the application code such that the function is executed after a pointer selection at a second element location that is the first offset vector away from the first element location, and
determine that the received coordinates correspond to the second element location,
wherein the processor operates in connection with the interface to:
transmit the changed application code to the client device for display within the application viewer with:
the element located at the first element location and the function located at the second element location, and
the pointer displayed at a second pointer location that is the second offset vector away from the first pointer location, and
responsive to determining that the received coordinates correspond to the second element location, generate an indication of the pointer selection being valid.

13. The apparatus of claim 12, wherein the interface is communicatively coupled to an application server that hosts the application, and
wherein the interface receives the application code from the application server after the client device sends the application server a request for the application.

14. The apparatus of claim 13, wherein the processor operates in connection with the interface to transmit the indication of the pointer selection being valid to the application server, causing the application server to process the selection of the function.

15. The apparatus of claim 13, which includes a proxy server configured as an intermediary device between the client device and the application server.

16. The apparatus of claim 12, wherein the processor is configured to change the location of the pointer by causing a pointer associated with an operating system of the client device to be hidden and creating or modifying a pointer file to be the second offset vector away from the hidden pointer.

17. The apparatus of claim 12, wherein the processor is configured to change the location of the pointer within the application viewer by changing a location of a pointer graphic within a pixel area of a pointer file such that the pointer graphic is separated from the pointer hot spot by the second offset vector.

18. The apparatus of claim 12, wherein the processor is configured to determine at least one of the first offset vector and the second offset vector as a function based on at least one of the pointer's location within the application viewer or a time.

19. The apparatus of claim 18, wherein the function includes at least one of a linear function, a piecewise linear function, a curvilinear function, a sinusoidal function, or a combination thereof.

20. The apparatus of claim 12, wherein the processor is configured to confirm that at least one of the first offset vector and the second offset vector does not render the application code inoperable.

* * * * *